US012419270B2

(12) United States Patent
 Orleans

(10) Patent No.: US 12,419,270 B2
(45) Date of Patent: Sep. 23, 2025

(54) SECURE STACKABLE CAGE FOR TRANSPORTING SMALL ANIMALS

(71) Applicant: Alex Orleans, Edmonds, WA (US)

(72) Inventor: Alex Orleans, Edmonds, WA (US)

( * ) Notice: Subject to any disclaimer, the term of this patent is extended or adjusted under 35 U.S.C. 154(b) by 150 days.

(21) Appl. No.: 17/510,031

(22) Filed: Oct. 25, 2021

(65) Prior Publication Data

US 2022/0378010 A1 Dec. 1, 2022

Related U.S. Application Data

(63) Continuation-in-part of application No. 29/785,567, filed on May 26, 2021, now Pat. No. Des. 996,728, and a continuation-in-part of application No. 29/785,601, filed on May 26, 2021, now Pat. No. Des. 996,729.

(51) Int. Cl.
 *A01K 1/02* (2006.01)
 *A01K 31/00* (2006.01)

(52) U.S. Cl.
 CPC .......... *A01K 1/0245* (2013.01); *A01K 31/002* (2013.01)

(58) Field of Classification Search
 CPC ........ A01K 1/03; A01K 1/031; A01K 1/0236; A01K 31/002; B65D 21/023; B65D 21/0212; B65D 21/0235; B65D 21/0215; B65D 21/0223; B65D 21/0222; B65D 21/0216; B65D 21/0202; B65D 21/0204; B25H 3/02; B25H 3/021; B25H 3/022; B25H 3/026; B25H 3/028
 See application file for complete search history.

(56) References Cited

U.S. PATENT DOCUMENTS

| | | | | |
|---|---|---|---|---|
| 1,331,862 | A | * 2/1920 | Claus | B65D 21/023 206/511 |
| 3,117,692 | A | * 1/1964 | Carpenter | B65D 43/0212 206/508 |
| 3,486,680 | A | 12/1969 | Negus, Jr. | |
| 3,498,494 | A | * 3/1970 | Voorhees, Jr. | B65D 21/045 220/23.88 |

(Continued)

FOREIGN PATENT DOCUMENTS

| | | | | |
|---|---|---|---|---|
| JP | S54104332 U | * 7/1979 | | B65D 1/26 |
| JP | 2000128201 A | * 5/2000 | | B65D 43/16 |

(Continued)

*Primary Examiner* — Peter M Poon
*Assistant Examiner* — Carly W. Lynch
(74) *Attorney, Agent, or Firm* — Seed Intellectual Property Law Group LLP

(57) ABSTRACT

An animal shipping cage is provi6ded that can be a single size or in two or more different sizes. The cages are stackable, one on top of the other which has a number of benefits when shipping small animals. A cage of a single size is configured to have one cage stacked on top of another. Cages of two different sizes are configured to be stacked on top of each other in the same stack. Having a combination of cages, a small cage and a large cage, which can be stacked on top of each other in a secure fashion provides significant benefits when shipping a large number of different types of small animals. In one embodiment, a secure lock is provided that ensures the lid to the cage can only be opened by an intentional action of high force and confirmation obtained that it was not opened during shipment.

19 Claims, 40 Drawing Sheets

(56) References Cited

U.S. PATENT DOCUMENTS

| | | | |
|---|---|---|---|
| 3,524,431 A | 8/1970 | Graham et al. | |
| D229,948 S | 1/1974 | Box | |
| 4,105,117 A * | 8/1978 | Atkin | B65D 21/04 |
| | | | 206/506 |
| D255,724 S | 7/1980 | Carroll et al. | |
| 4,286,713 A * | 9/1981 | Marchais | B65D 21/02 |
| | | | 206/508 |
| D286,937 S | 11/1986 | Schafer | |
| D356,256 S | 3/1995 | Romanoff | |
| D374,555 S | 10/1996 | McMath | |
| 5,617,953 A * | 4/1997 | Cope | B65D 21/00 |
| | | | 206/501 |
| 5,632,405 A | 5/1997 | McMath | |
| 5,641,090 A * | 6/1997 | Kowalski | B65D 41/16 |
| | | | 220/782 |
| D382,112 S | 8/1997 | Egan | |
| 5,797,350 A * | 8/1998 | Smith | A01K 1/035 |
| | | | 119/475 |
| 5,954,013 A * | 9/1999 | Gabriel | A01K 1/00 |
| | | | 119/419 |
| 6,041,931 A | 3/2000 | Jacques | |
| 6,295,950 B1 * | 10/2001 | Deitrich | A01K 1/03 |
| | | | 119/419 |
| 6,371,364 B1 * | 4/2002 | Maillot | B65D 21/0219 |
| | | | 206/508 |
| 6,588,373 B1 * | 7/2003 | Strzempko | A01K 1/031 |
| | | | 119/416 |
| 7,163,122 B2 * | 1/2007 | Elder | B65D 6/10 |
| | | | 220/669 |
| D593,324 S | 6/2009 | Simas | |
| 8,490,810 B2 * | 7/2013 | Lown | B65D 6/28 |
| | | | 220/4.26 |
| D701,044 S | 3/2014 | Kishimoto | |
| 9,550,605 B1 * | 1/2017 | Summers | B62B 3/004 |
| 2006/0201439 A1 | 9/2006 | Ficker et al. | |
| 2007/0227460 A1 * | 10/2007 | Lynch | A01K 31/06 |
| | | | 119/455 |
| 2008/0190922 A1 * | 8/2008 | Kraeling | B65D 6/16 |
| | | | 220/6 |
| 2008/0190951 A1 * | 8/2008 | Gallagher | B65D 51/04 |
| | | | 220/826 |
| 2012/0006837 A1 * | 1/2012 | Becklin | B65D 90/00 |
| | | | 220/694 |
| 2022/0177191 A1 * | 6/2022 | Brunner | A45C 5/14 |
| 2022/0378010 A1 | 12/2022 | Orleans | |

FOREIGN PATENT DOCUMENTS

| | | | | |
|---|---|---|---|---|
| JP | 2002045068 A | * | 2/2002 | A01K 1/03 |
| JP | 2011140324 A | * | 7/2011 | B65D 67/02 |
| KR | 200324874 Y1 | * | 8/2003 | A01K 1/0047 |
| WO | WO2006129655 A1 | * | 12/2006 | B65D 1/22 |
| WO | WO-2022164411 A1 | * | 8/2022 | A01K 31/00 |

* cited by examiner

SECURE STACKABLE CAGE FOR TRANSPORTING SMALL ANIMALS

CROSS-REFERENCE TO RELATED APPLICATIONS

This application is a continuation-in-part that claims the benefit of and priority to U.S. application Ser. No. 29/785,567, filed May 26, 2021, entitled "LARGE TRANSPORT CAGE FOR SMALL ANIMALS PROVIDING A HIGH AIR FLOW THAT IS ALSO STACKABLE". This application is also a continuation-in-part that claims the benefit of and priority to U.S. application Ser. No. 29/785,601, filed May 26, 2021, entitled "SMALL TRANSPORT CAGE FOR SMALL ANIMALS PROVIDING A HIGH AIR FLOW THAT IS ALSO STACKABLE," both of which are hereby incorporated in their entirety by reference.

BACKGROUND

Technical Field

This disclosure is in the field of providing secure cages for the transportation of small animals, and in particular, a cage having adequate ventilation and a secure lock to safely transport small animals.

Description of the Related Art

There are numerous types and styles of containers for transporting small animals. These may be in the form of baskets, cages, containers, or other types of containers to hold the small animal for transportation. Some of these containers are made for individual use in order to carry and transport an individual animal, while other containers are made for transporting a group of animals, such as several small chickens, mice, hamsters, or other small animals. It is desirable to ensure that the animals being transported have sufficient ventilation for good air flow, both for breathing and also to provide good exchange of air for the smells that come from the animal, whether emanating from the skin or waste products.

BRIEF SUMMARY

An animal shipping cage that can be stacked on top of each other is provided. This can be a single size or in two or more different sizes. The cages are stackable, one on top of the other which has a number of benefits when shipping a large number of animals. Cages of a single size are configured to have one cage stacked on top of another. Further, cages of two different sizes are configured to be stacked on top of each other in the same stack. Having a combination of cages, a small cage and a large cage, which can be stacked on top of each other in a secure fashion provides significant benefits when shipping a large number of different types of small animals. The particular interlocking between the feet and the lid of the cages provides a combination of stacking techniques for the small and large cages to be stacked on top of each other safely while holding animals therein. In addition, while the cages are stacked on top of each other, sufficient air flow is ensured to be provided so that each of the animals in every cage of the stack has sufficient air for breathing as well as a good air flow exchange for odor control. Further, a secure lock can be provided with a lid that permits the loading of a number of small animals easily into the cage and assurance can be provided that the cage was not opened during shipment. According to principles of the present disclosure, the inventor has designed a small animal transportation cage that has sufficient ventilation in order to ensure that a plurality of all types of animals to be transported therein will have good air flow, both for their breathing and for the release of odors from the animal. In addition, the inventor has provided a secure lock on the cage during transportation that is particularly beneficial to ensure that the cage does not accidentally come open to permit the animal to escape. While having latches that can be applied by the user and removed by the user are useful, the inventor has realized that the most secure latch is one which cannot be easily opened by the user once the cage is closed. Further, it should be a tamper-proof latch which cannot be tampered with and can only be opened by the appropriate person at an acceptable time. In addition, the latch should be of a type which cannot be accidentally opened and, therefore, should be recessed in its location and require particular access with deliberate attention paid in order to open the latch to remove the lid, accordingly, the inventor has designed and provided such a latch, with a locking tab.

Additionally, the inventor created two sizes of cages that are stackable, which has a number of benefits when shipping a large number of animals. Many times, suppliers of animals may need to ship several dozen animals at the same time, for example several dozen hamsters, while at the same time maybe shipping several dozen birds, mice, or even small puppies and newborn kittens. Each of these animals may require a different size cage, some of them may be suitably shipped in a small cage, such as a few mice; on the other hand, kittens and small puppies require a larger cage for shipping. Having a combination of cages, a small cage and a large cage, which can be stacked on top of each other in a secure fashion provides significant benefits when shipping a large number of different types of small animals. According to principles of this disclosure, a small cage is provided which has a secure lock with a lid that permits the loading of a number of small animals easily into the small cage. In addition, a large cage, which is approximately double the volume of the smaller cage that is provided, which also has a large opening when the lid is removed which can be securely fastened to the cage. The dimensions, features, ridges, and design of the small and large cages are made relative to each other such that they can be stacked on top of each other in many acceptable types of patterns. Numerous large cages can be stacked on top of each other, numerous small cages can be stacked on top of each other, and in addition, the small cages may be securely and properly stacked on top of the large cages, and the large cages can be securely and properly stacked on top of the small cages. The particular interlocking between the feet and the lid of the large cages between other large cages as well as between the large cage and the small cage, as well as between the small cage with other small cages, provides a combination of stacking techniques for the small and large cages to be stacked on top of each other safely while holding animals therein. In addition, while the cages are stacked on top of each other, sufficient air flow is ensured to be provided so that each of the animals in every cage of the stack has sufficient air for breathing as well as a good air flow exchange for odor control.

BRIEF DESCRIPTION OF THE SEVERAL VIEWS OF THE DRAWINGS

The figures as provided herein are drawn to scale with respect to the actual size of the inventive structure. The locations and dimensions are all according to correct scale, including the relative dimensions and location of the various features in the structures shown herein form part of the technical disclosure. Accordingly, the relative size and scale of each item in each figure forms a part of the inventive disclosure as provided herein.

DETAILED DESCRIPTION

Figure 1:
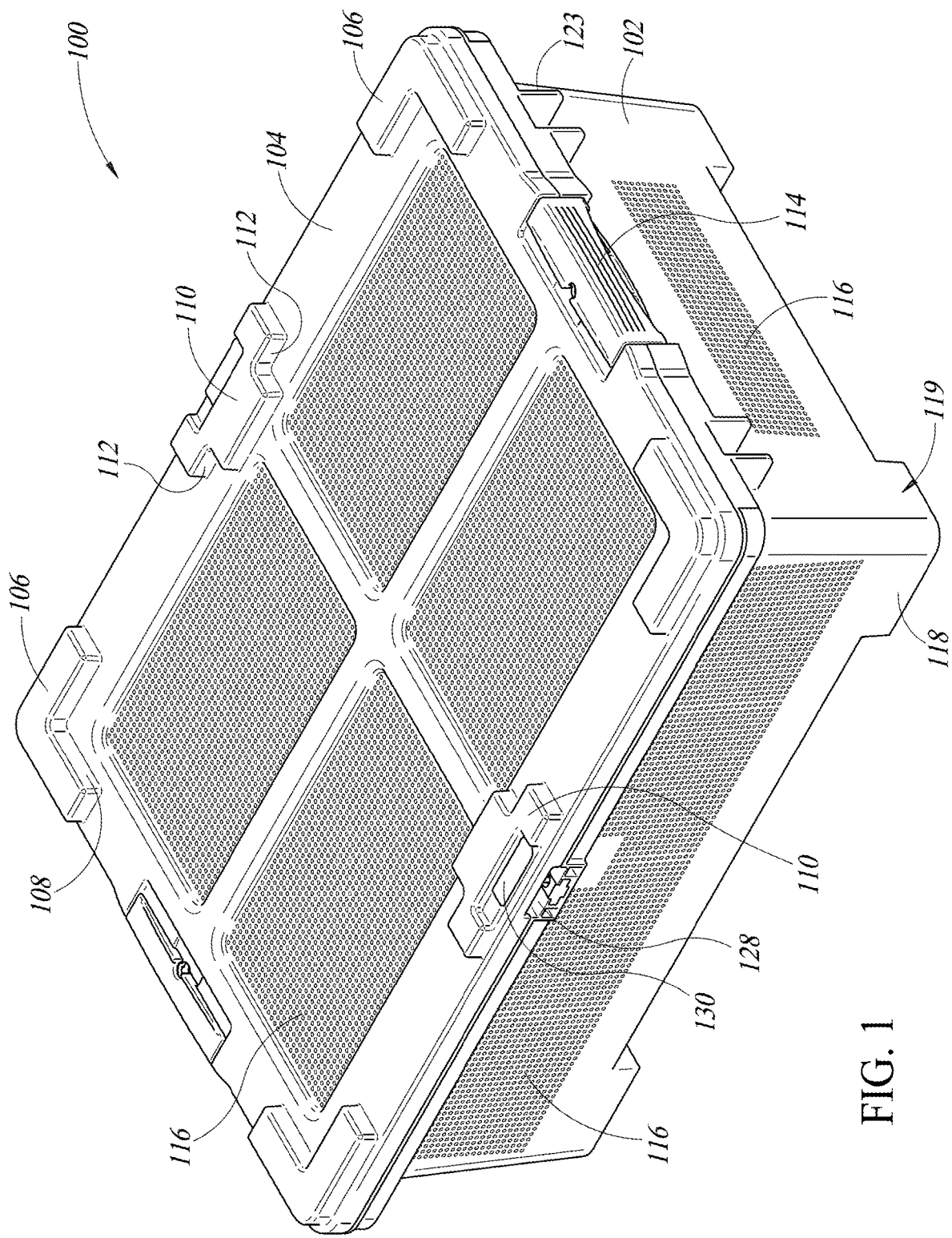
FIG. 1 is a top perspective view of a large transport cage for small animals providing a high air flow and being stackable showing one embodiment.

FIG. 1 is an isometric view of a large cage 100 for the holding of one or more small animals. As noted elsewhere herein, the figures of this application form part of the technical disclosure and are drawn according to their exact scale of the respective features. Thus, the position of each feature and their relative scale to all other features in that same figure are correct and form part of the invention disclosure. This applies to all figures of this application and the scale is correct within each figure itself; the scale is different for different figures and thus cannot be considered a uniform scale for all figures.

As can be seen in FIG. 1, the cage 100 has a lid 104 which can be held in the closed position by closing clamps 114. On the top of the lid 104 are ridges 106 in each corner. The ridges 106 have an inner sidewall 108. In the central portion of lid 104 is a center ridge 110. This center ridge 110 has inner side walls 112 at each side thereof, facing the interior of the lid 104. There are a large number of apertures 116 in the lid 104 that provide a free flow of air into and out of the cage 100.

The large cage 100 has a cage body 102 for holding the animals which are contained therein. The cage body 102 includes apertures 116 which provide for a large airflow from all side walls of the cage and also through the lid 104. Feet 118 are positioned at the bottom of the cage body 102 at each corner. The feet 118 have an outer surface 119 on all feet. The cage 100 also includes a locking tab 130 which is positioned through an opening 128, as can be seen in the side of the cage 100 of FIG. 1.

Figure 2:
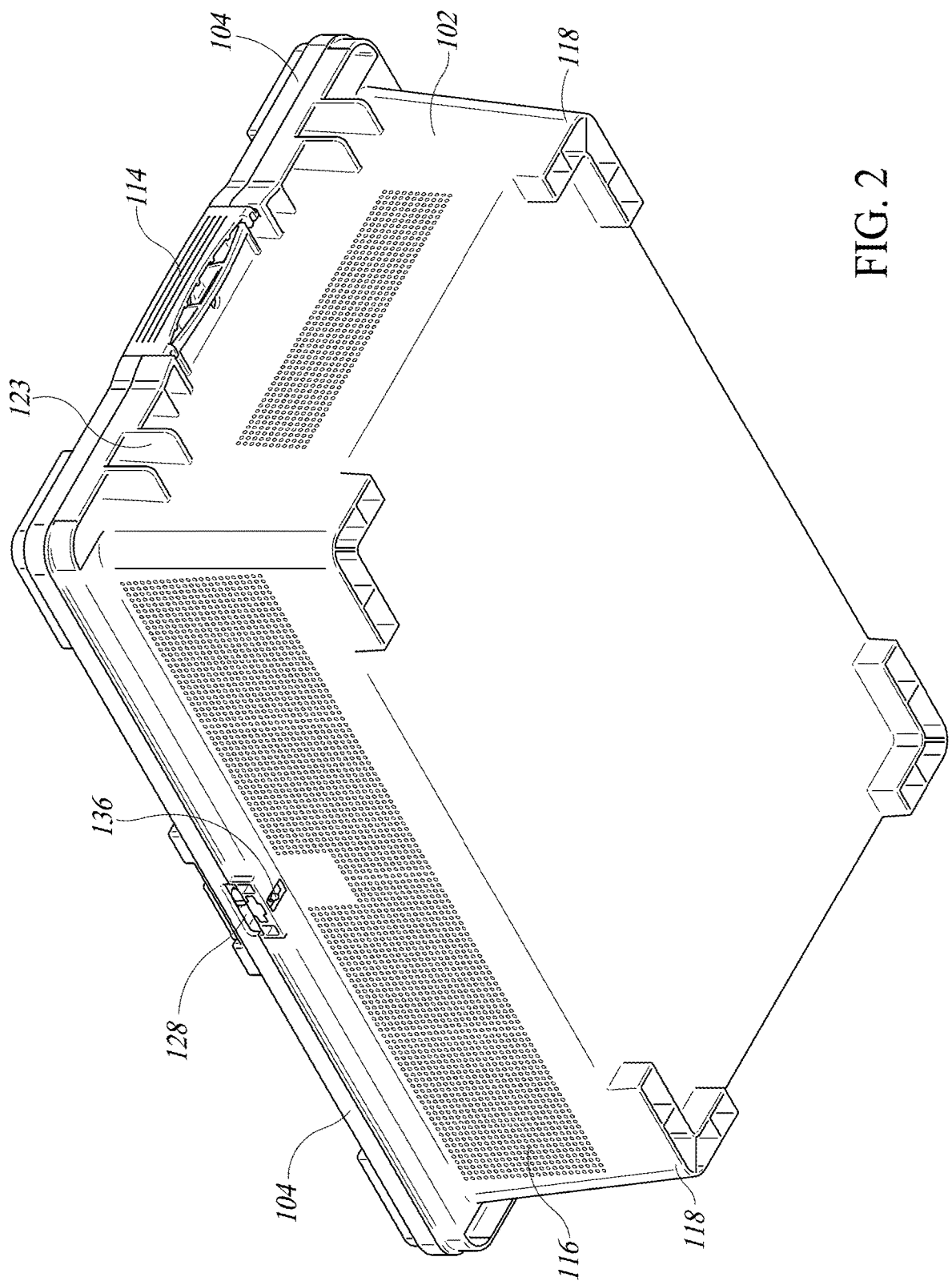
FIG. 2 is a bottom perspective view of the embodiment of FIG. 1.

FIG. 2 shows a bottom view of the cage 100 having the feet 118 on the bottom of the cage body 102. The locking tab has a tip 136 that extends through an aperture of the cage body 102. The locking tab extends through space 128, starting with the lid 104 and going into the cage body 102.

Figure 3:
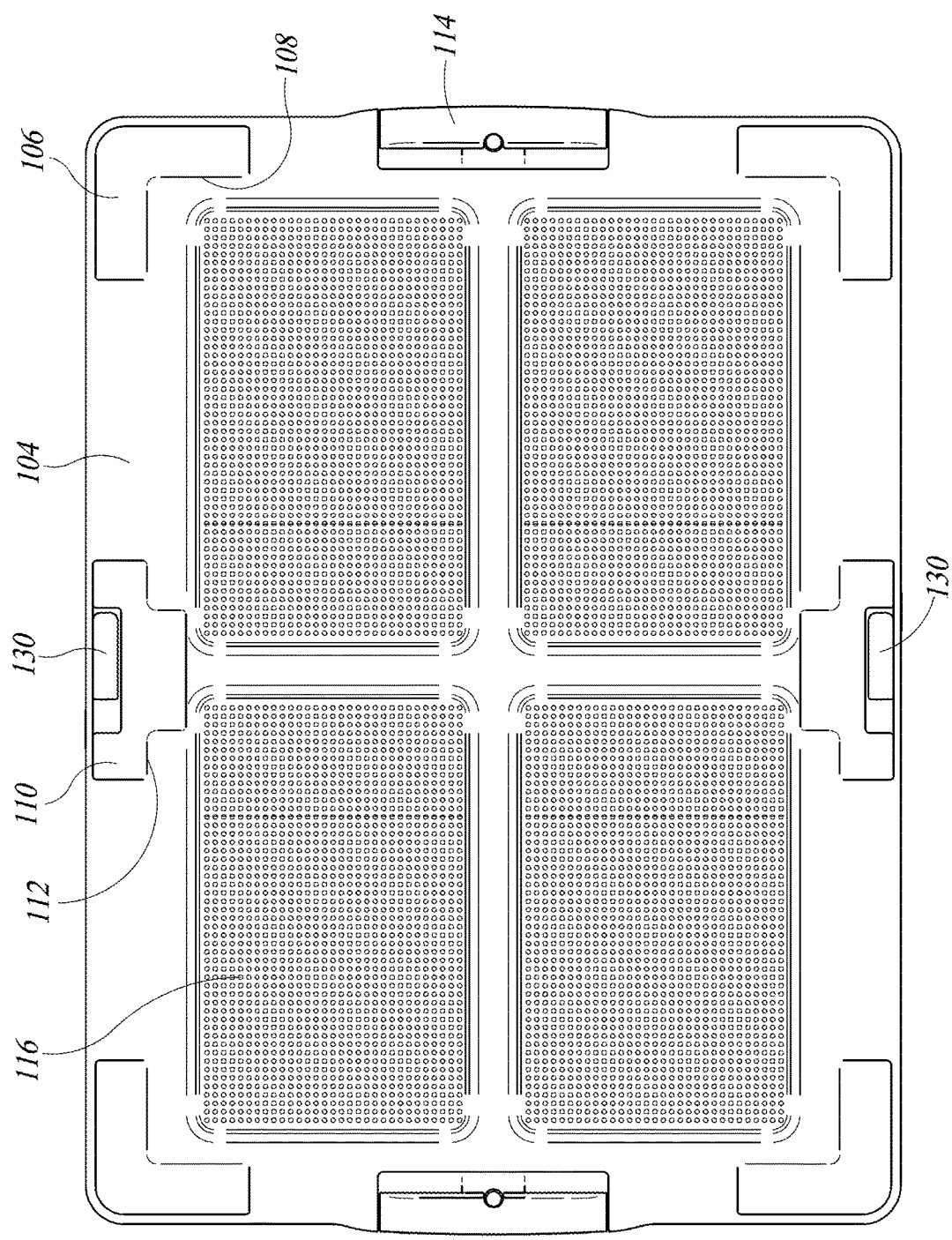
FIG. 3 is a top plan view of the embodiment of FIG. 1.
Figure 4:
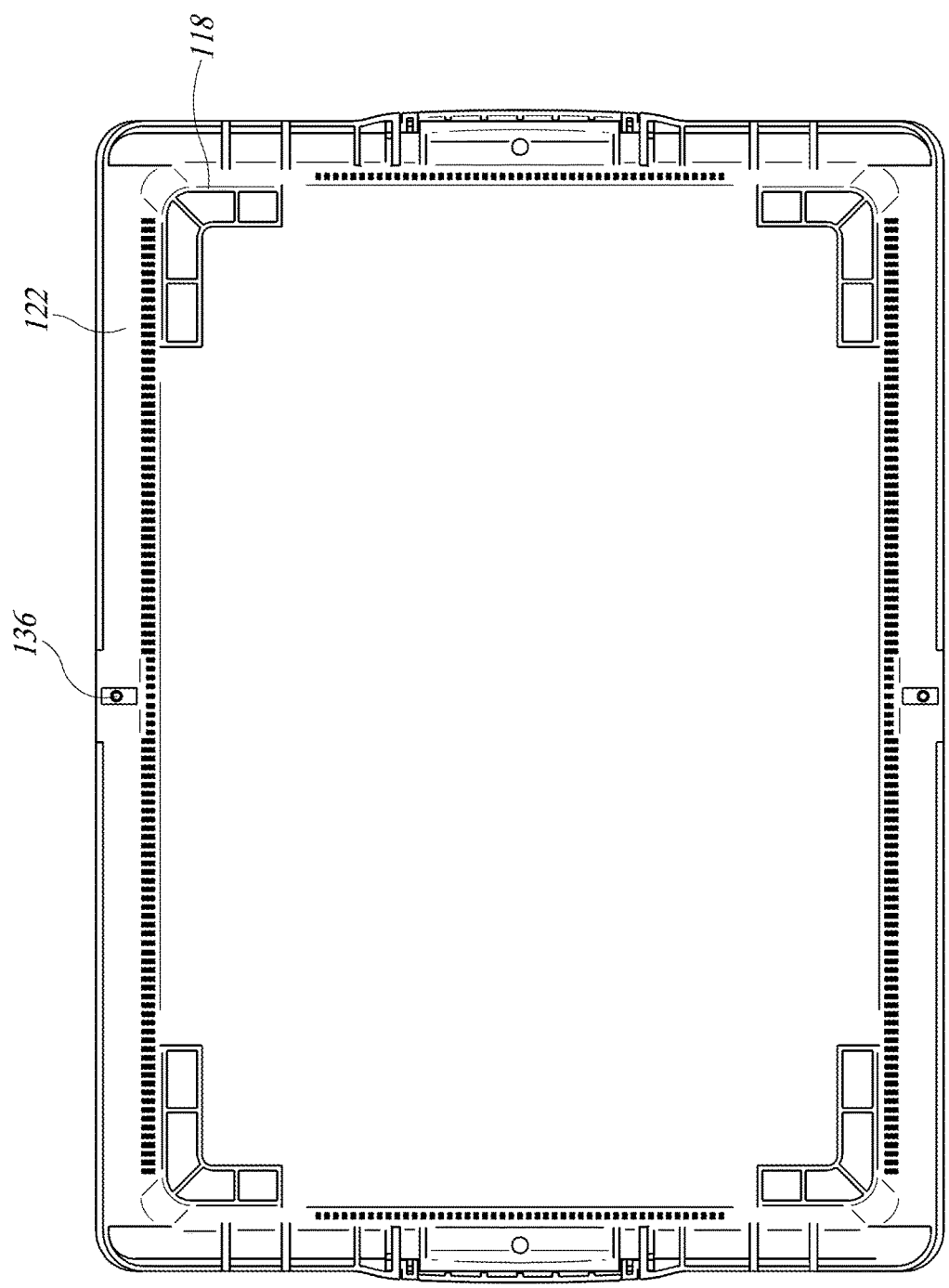
FIG. 4 is a bottom view of the embodiment of FIG. 1.

FIG. 3 shows a top view of the cage 100 having closing clamps 114 at either end thereof. The locking tab 130 extends through a recessed portion in the center ridge 110. The center ridge 110 has inner walls 112. The corner ridges 106 have inner walls 108. FIG. 4 is a bottom view of the cage 100 in which the locking tab having the tip 136 can be seen therein. An extension 122 from the cage body 102 extends along the upper sidewall, all the way around the outer upper edge of the cage body 102. Feet 118 are in the bottom of the cage body 102. A plurality ribs 123 extend down from the extension 122, along the sidewall, as can be seen in FIGS. 1, 2, 5, 6, 7 along with other figures.

Figure 5:
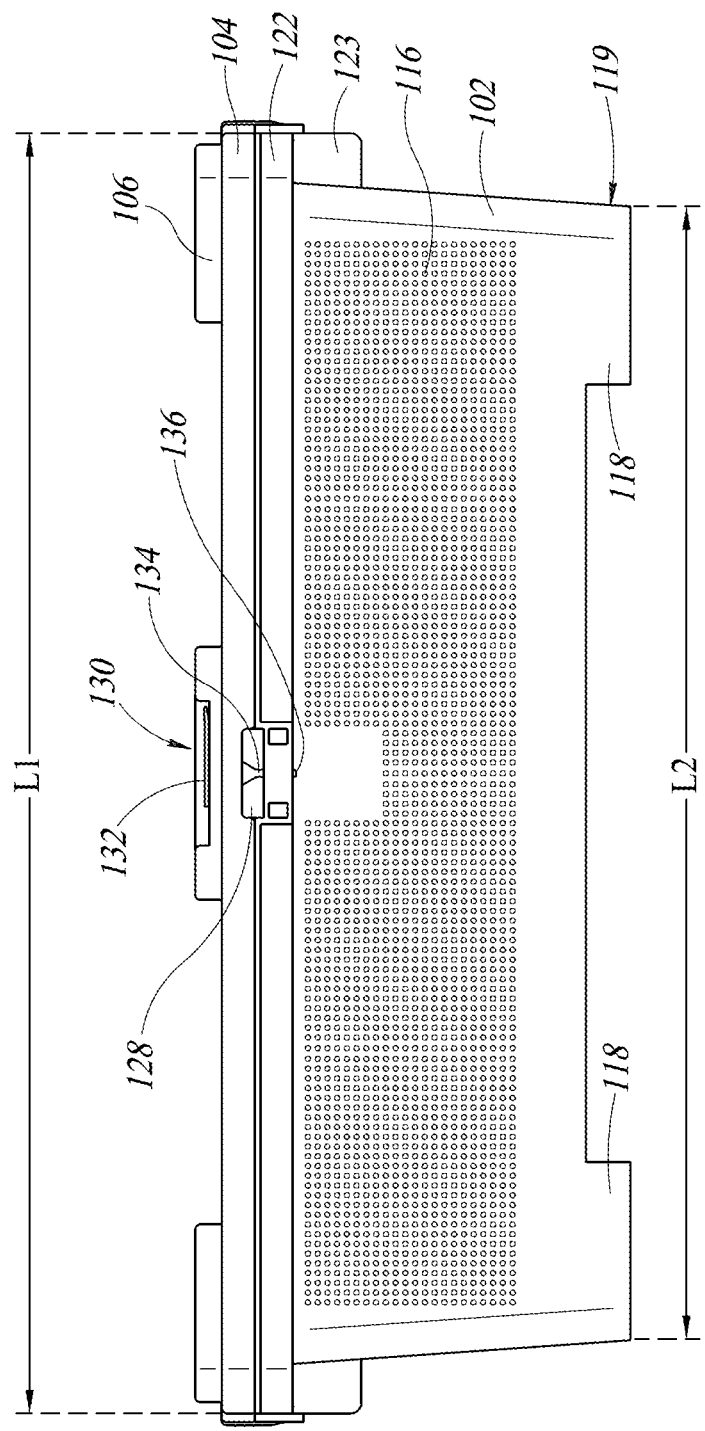
FIG. 5 is a right side elevation view of the embodiment of FIG. 1.

FIG. 5 is a side elevation view of the large cage 100 for the small animals. The upper length of the cage 100 is L1 extending from the left edge to the right edge of the cage itself 100, which is comprised of the lid 104 and the cage body 102. The extension 122 at the upper edge of the cage body extends to the same length as the lid 104 so that the lid 104 exactly fits on top of and mates with the cage body 102 along the entire circumference of the extension region 122. The lid 104 has ridges 106 at each corner. The bottom length of the cage body 102 is dimension L2 which is less than the dimension L1 as shown in FIG. 5. There's a large plurality of apertures 116 to provide clean airflow through the cage 100. Locking tab 130 has a top 132 and a shaft 134 which extends to the opening 128 and into the extension 122 with the tip 136 extending out the bottom of the aperture which is in the extension 122.

Figure 6:
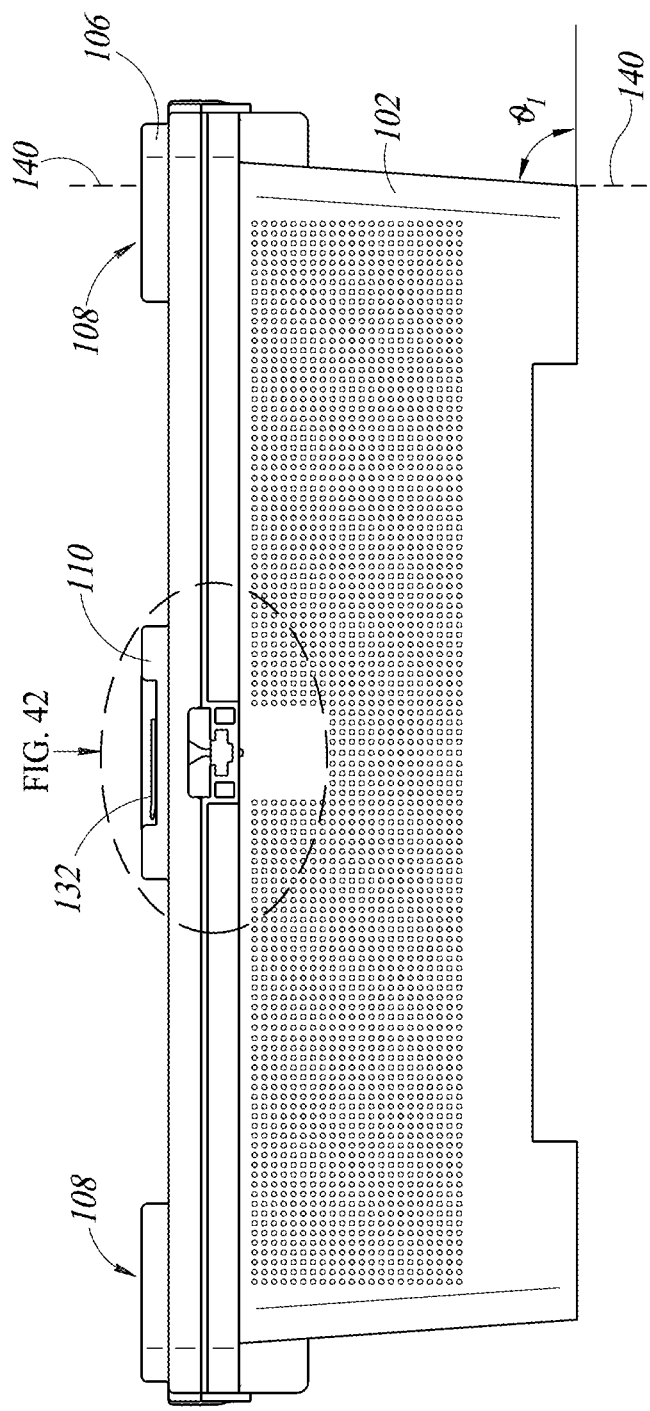
FIG. 6 is a left side elevation view of the embodiment of FIG. 1.

FIG. 6 is a side elevation view of the other side of the cage 100. This side elevation view shows that the side wall extending from the leg 118 is at an angle $\theta_1$ relative to the perpendicular bottom surface of the wall. The angle $\theta_1$ is selected to provide a slope of the sidewall of the cage body 102 that will cause the top dimension to have a length equal to L1 after the extension 122 is included. The - - - line 140 represents the location of the inner sidewall 108 on the upper ridge 106. In particular, the - - - line 140 shows that the inner surface of the sidewall 108 of the ridge 106 is exactly aligned with the outer surface 119 of the leg 118 as can be shown by the vertical line 140 at the leg 118. As will be explained later herein, this permits the leg 118 to be nested into the lid of a cage immediately below it and have the outer surface of the wall 119 abut against and be held securely by the inner surface 108 of the upper ridge 106.

Figure 42:
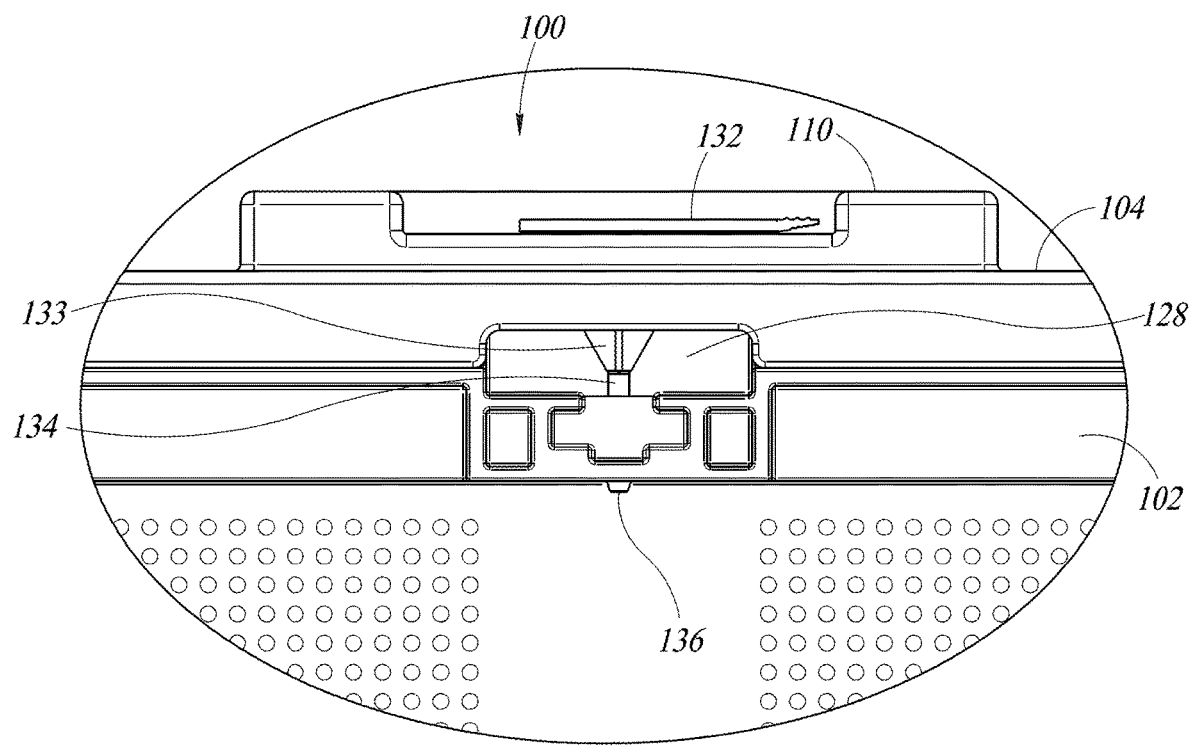
FIG. 42 is an enlarged side view of the portion from FIG. 6 showing the locking mechanism for the lid on the cage.

FIG. 6 also shows a section of the locking tab 130 which is enlarged in more detail in FIG. 42 which is positioned within a recess of the center ridge 110.

Figure 7:
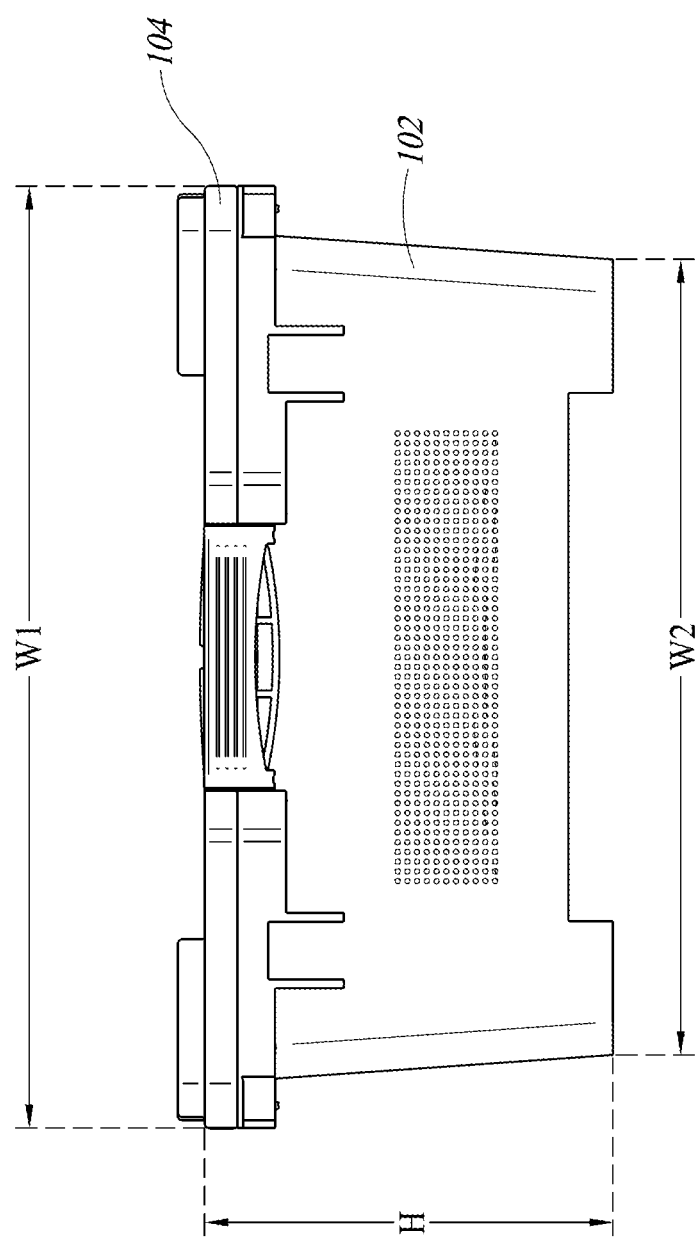
FIG. 7 is a front elevation view of the embodiment of FIG. 1.

FIG. 7 shows an end view of the cage 100 having the cage body 102 and the lid 104. The cage has an upper width W1 extending from one side to the other of the cage which includes the lid and the extension 122 at the upper portion of the cage body 102. It has a lower width W2 which extends from the outer wall 119 of the legs 118 on either side of the bottom of the cage 100. It has a height H extending from the bottom of the foot 118 to the top of the lid, not including the upper ridge 106. The end also includes a plurality of apertures 116 to which air can flow.

Figure 8:
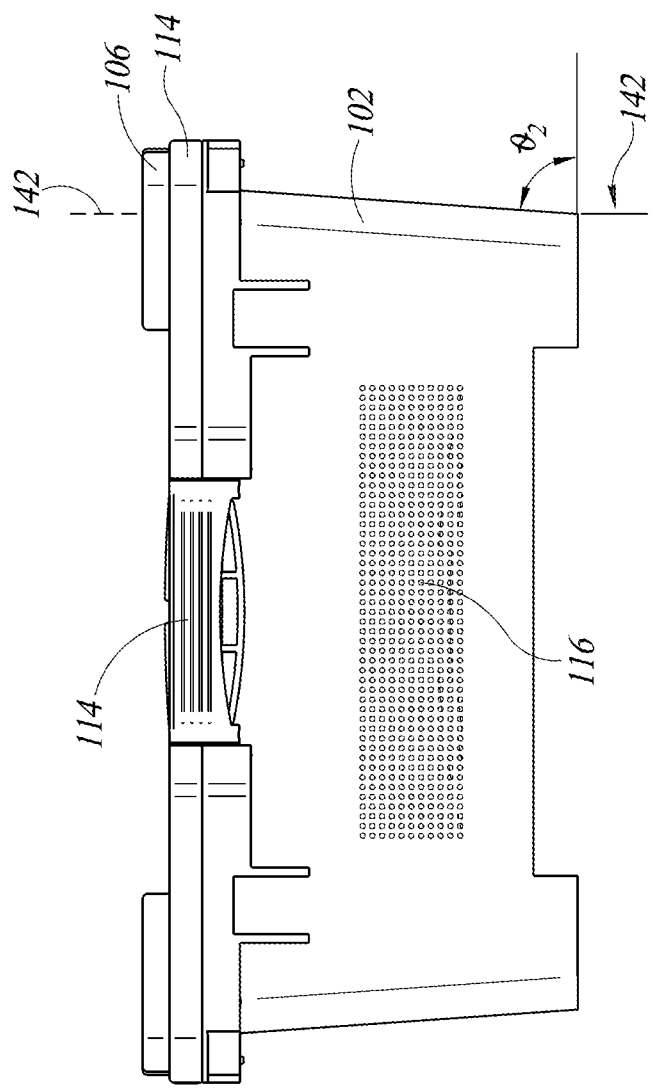
FIG. 8 is a rear elevation view of the embodiment of FIG. 1.

FIG. 8 shows the other end view of the cage 100 showing that the angle $\theta_2$ is provided for the sidewall of the cage body 102 relative to the horizontal of the bottom foot 118. In some embodiments, the angle $\theta_2$ will be equal to the angle $\theta_1$. The - - - - line 142 shows the location in the upper ridge 106 of the inner surface 108. From the edge view, this inner surface 108 is aligned exactly with the outer side wall 119 of the leg 118 that is positioned along the lengthwise extension of the cage 100. This permits the cage 100 to be nested into the lid of the cage directly below it to securely abut against and be held in position by the sidewall 108 at both the narrow end of the cage 100 and also along the longitudinal length of the cage 100. Accordingly, the leg 118 is held in position at two surfaces, one surface along its width and one surface along its length by nesting into the inner surface 108 which has a meeting surface of the exact width along the width and length of the lid 104. Closing clamps 114 keep the lid 104 securely fastened to the cage body 102 during normal use, to hold the lid firmly in position.

The closing clamps 114 or the bar of a rotational type that is well known in the art. In particular, a pivot extends from each end of the closing clamps 114 and is fixed into the extension 122. The pivots permit the closing clamps 114 to rotate outward, to be moved away from the lid 104 so that it can be fully removed from the cage body 102. When the lid 104 is positioned on top of the cage body 102, the closing clamps 114 can be rotated inward to clamp on the top of the lid 104 to securely hold it in position at both ends. Closing clamps 114 of this type are known in the art to those of ordinary skill and therefore will not be described in more detail herein.

Figure 9:
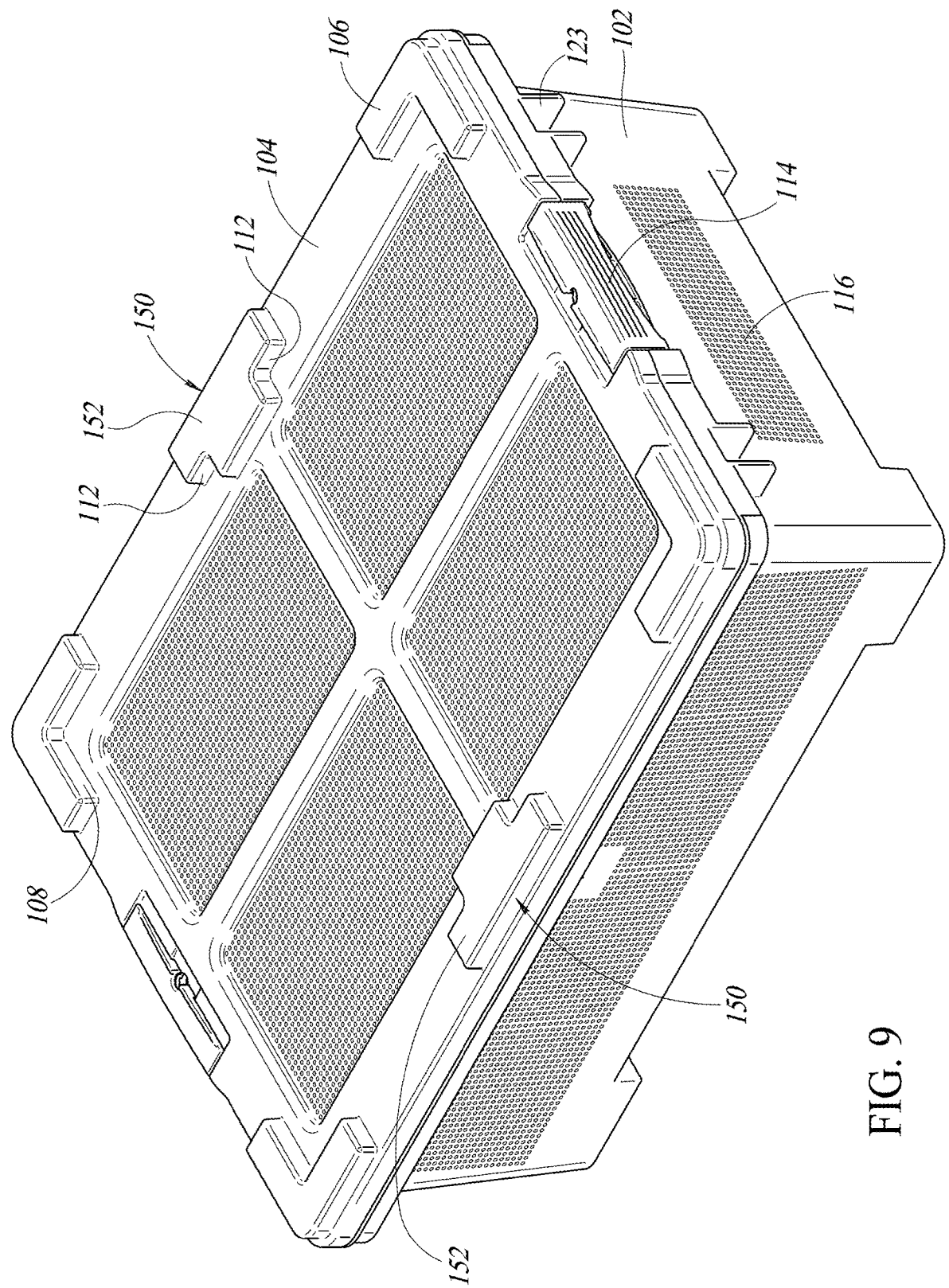
FIG. 9 is a top perspective view of a large transport cage for small animals providing a high air flow and being stackable showing an alternative embodiment.
Figure 10:
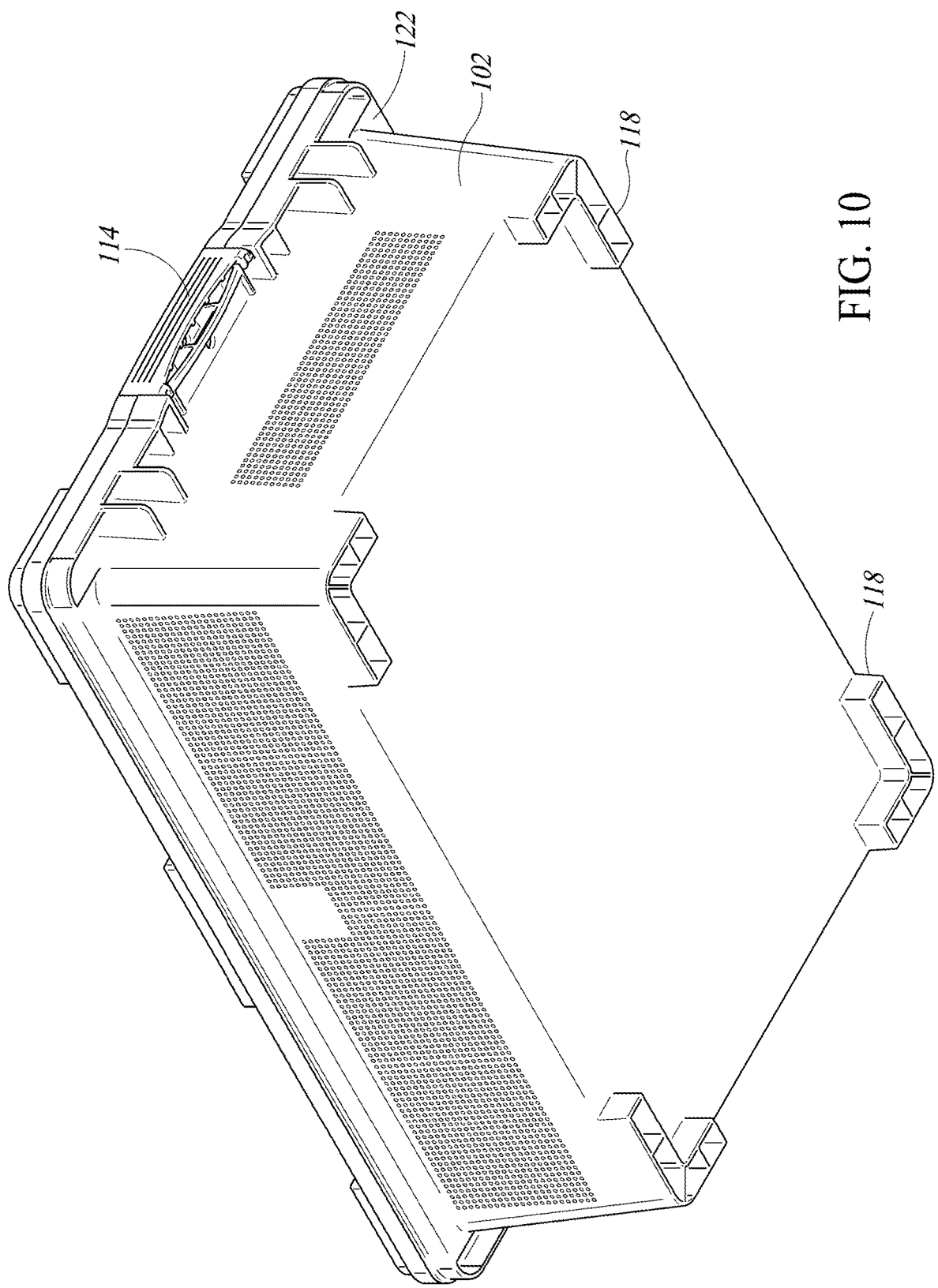
FIG. 10 is a bottom perspective view of the embodiment of FIG. 9.
Figure 11:
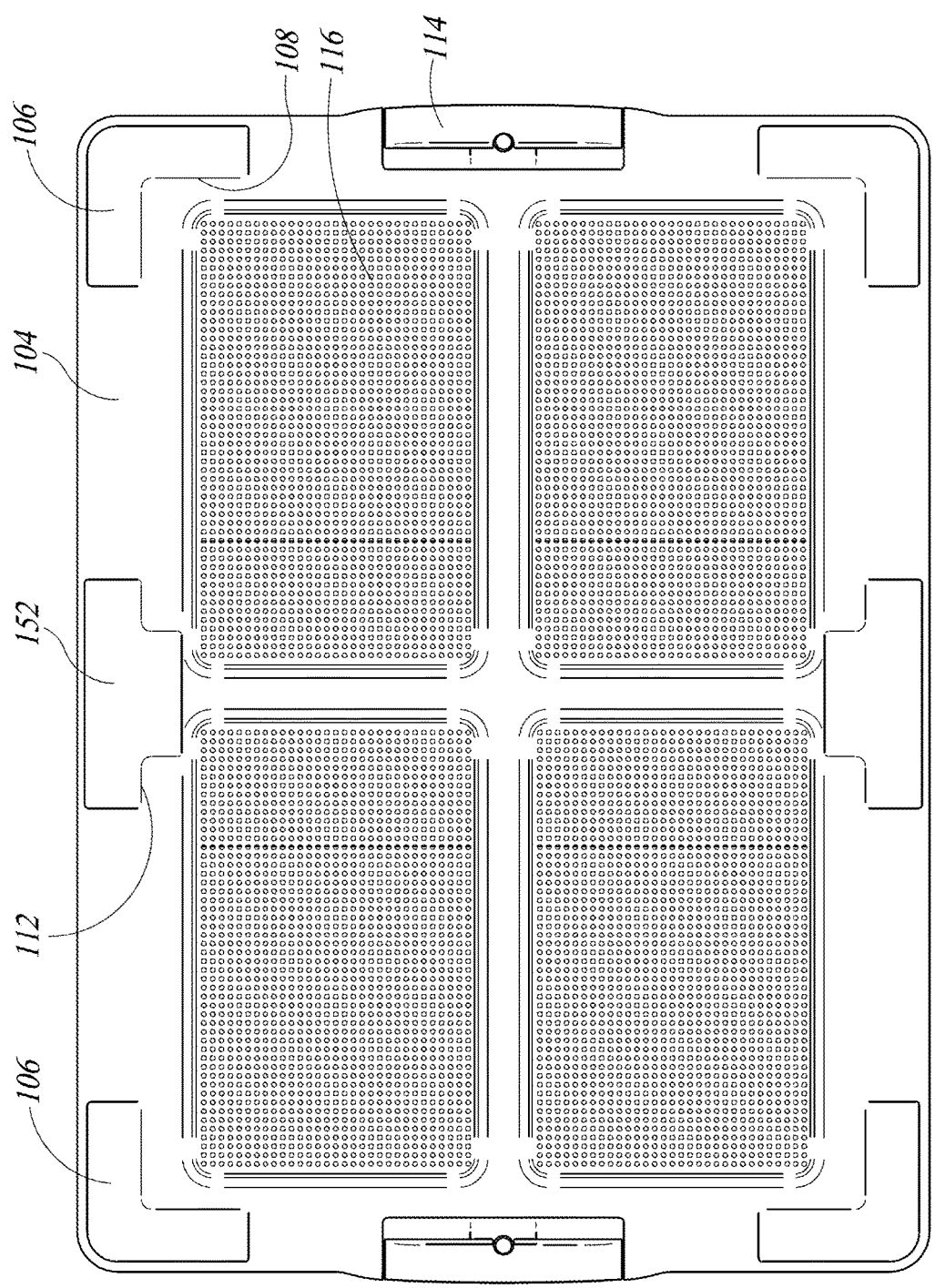
FIG. 11 is a top plan view of the embodiment of FIG. 9.
Figure 12:
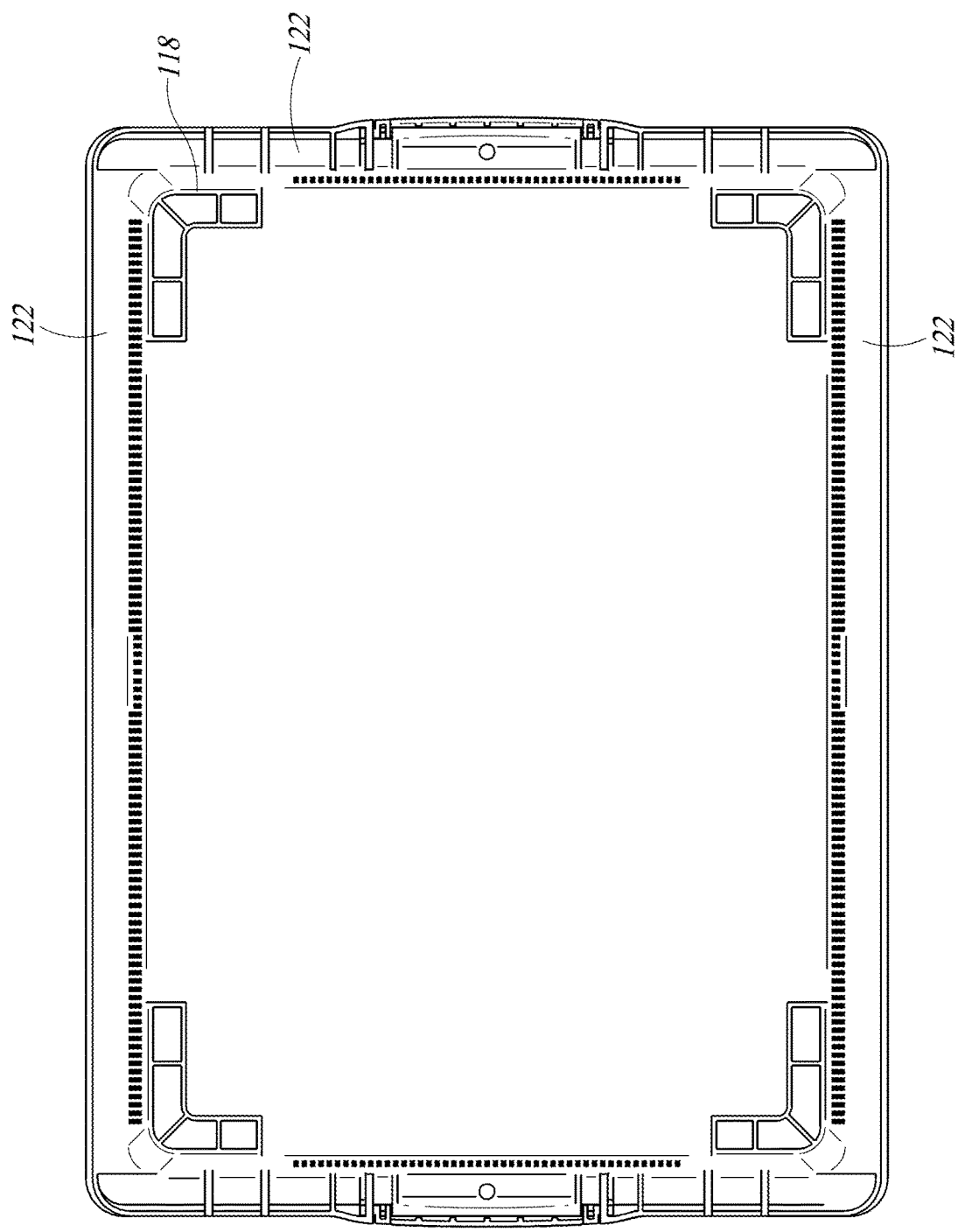
FIG. 12 is a bottom plan view of the embodiment of FIG. 9.
Figure 13:
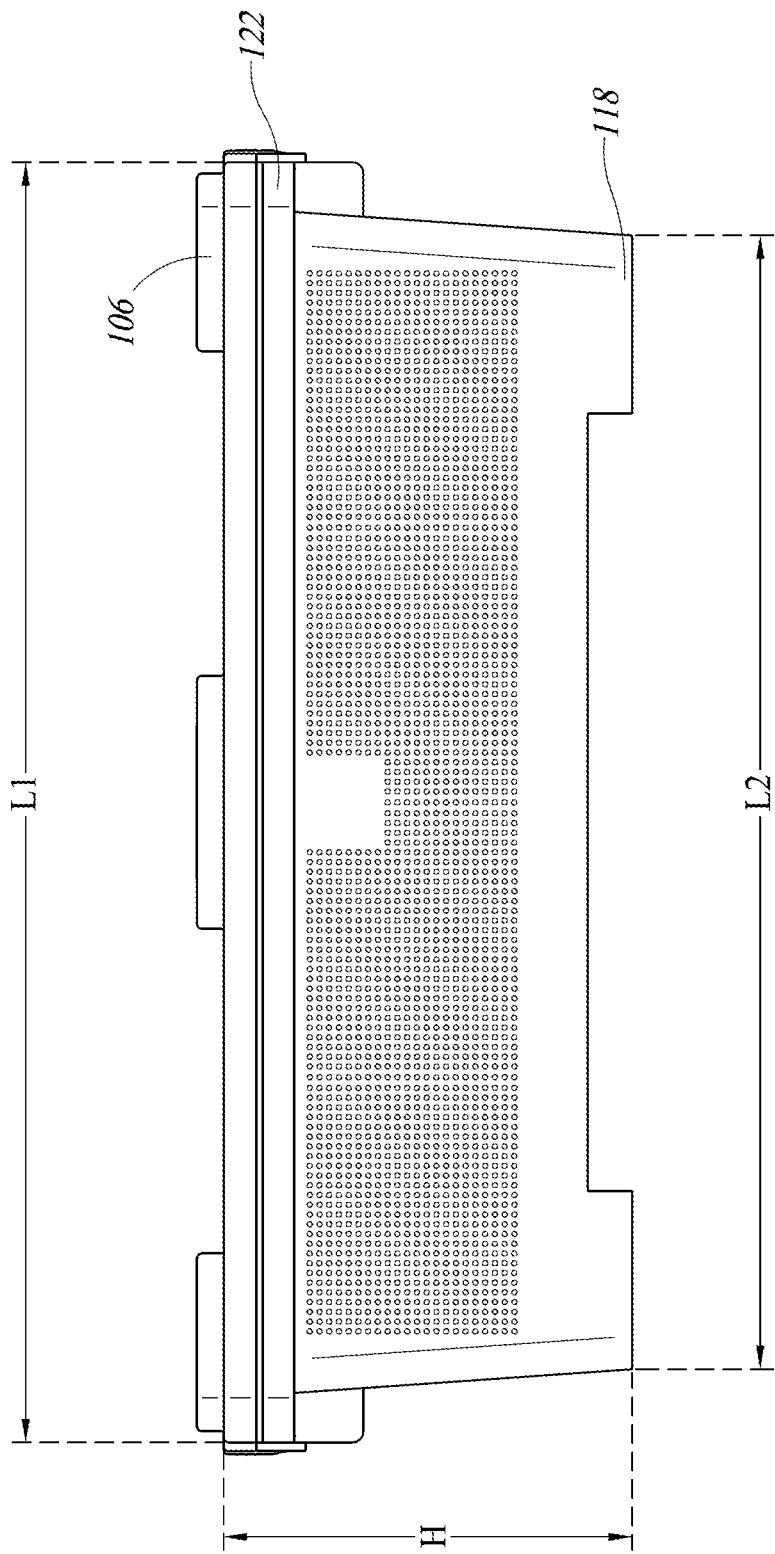
FIG. 13 is a right side elevation view of the embodiment of FIG. 9.
Figure 14:
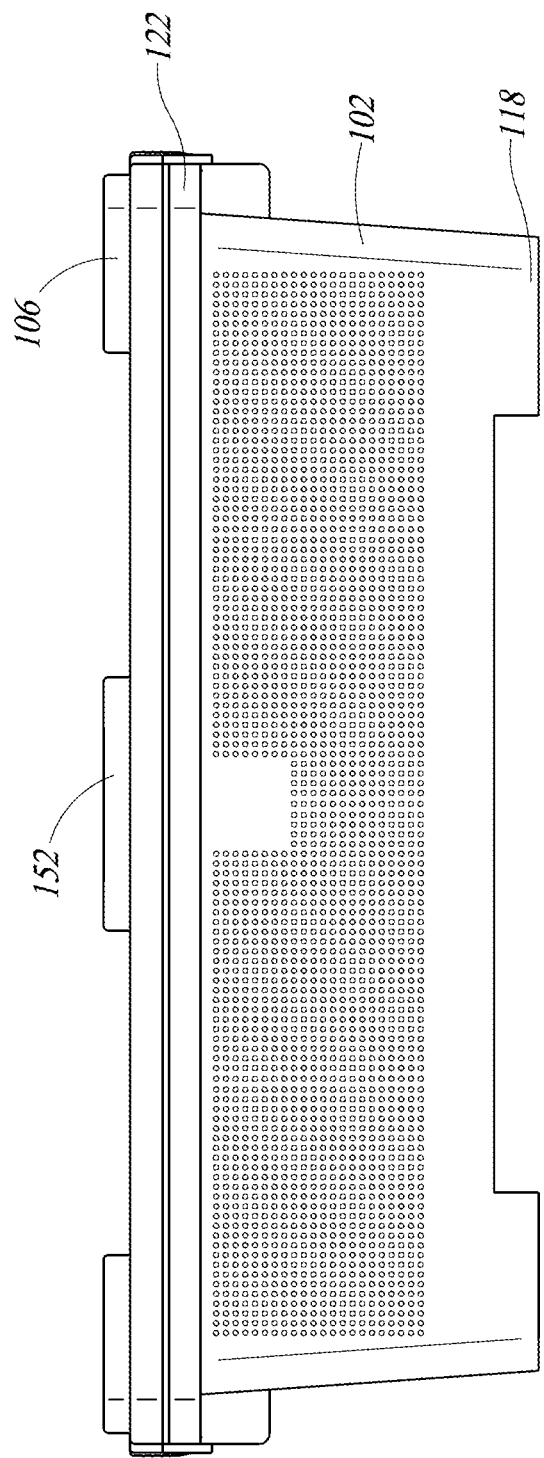
FIG. 14 is a left side elevation view of the embodiment of FIG. 9.
Figure 15:
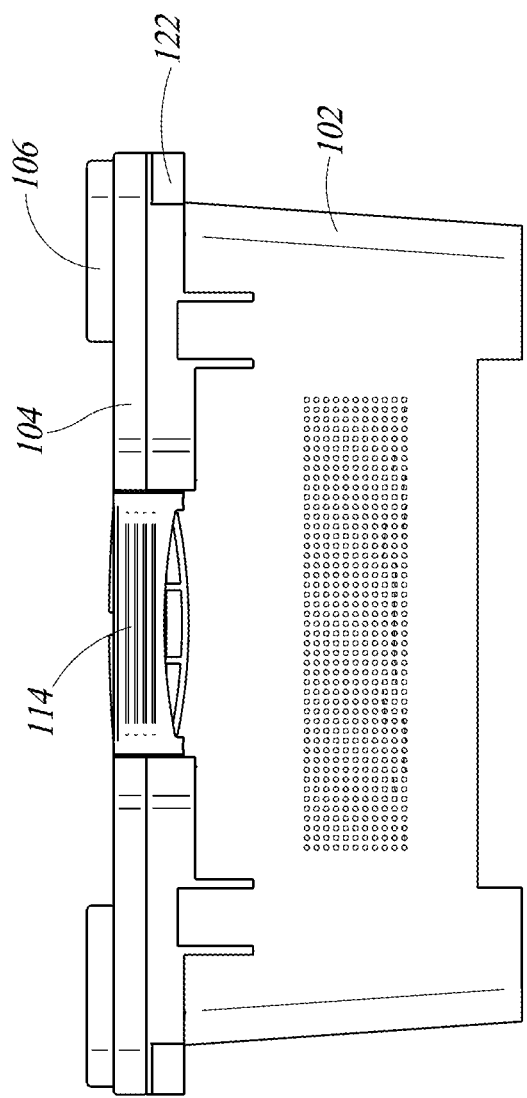
FIG. 15 is a front elevation view of the embodiment of FIG. 9.
Figure 16:
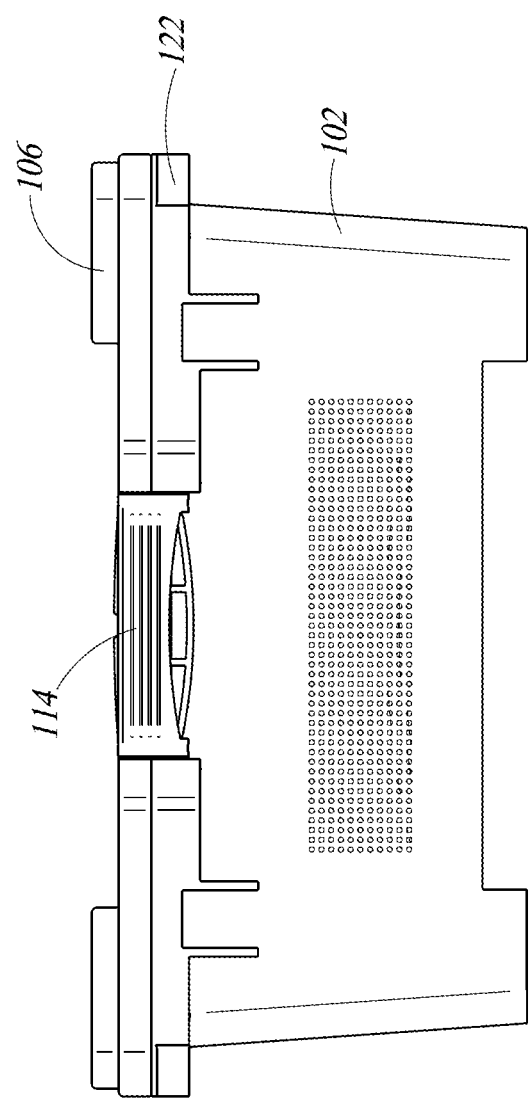
FIG. 16 is a rear elevation view of the embodiment of FIG. 9.

FIG. 9 is a large cage 101 of an alternative embodiment which is similar in many respects to the embodiment of FIG. 1. The only relevant difference between the cage 100 and the cage 101 is that the cage 101 does not have a locking tab 130. In particular, as can be seen the center ridge 152 has a flat contiguous outer surface 150 and does not have a recess therein in order to receive the locking tab 130. In this particular embodiment of the cage 101, it is locked and held with the lid securely on the cage body 102 only by the closing clamps 114 and does not have the additional locking tab 130 which is present in the embodiment of cage 100 as shown in FIGS. 1-8. All other features of the cage 101 as shown in FIGS. 9-16 are the same and, to save space, are not further described again herein in detail. The same reference numbers are used for the cage 101 as for the cage 100, and the same structures have the same names, as will be apparent to those of skill in the art upon reading this disclosure.

Figure 17:
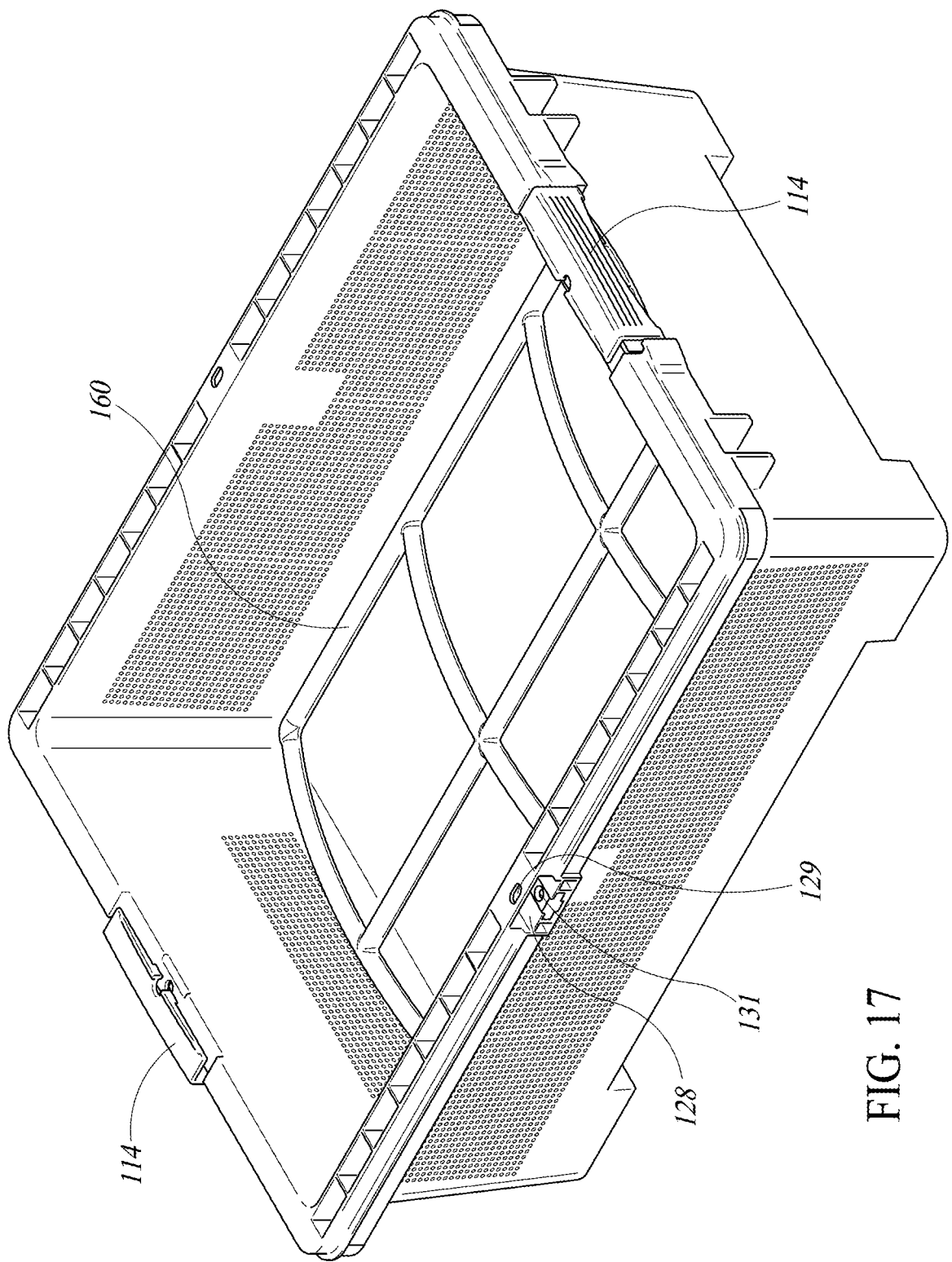
FIG. 17 is a top perspective view of a large transport cage for small animals that includes a bird perch in the interior and also provides a high air flow and being stackable with the lid not present, according to the embodiment of FIG. 1.
Figure 18:
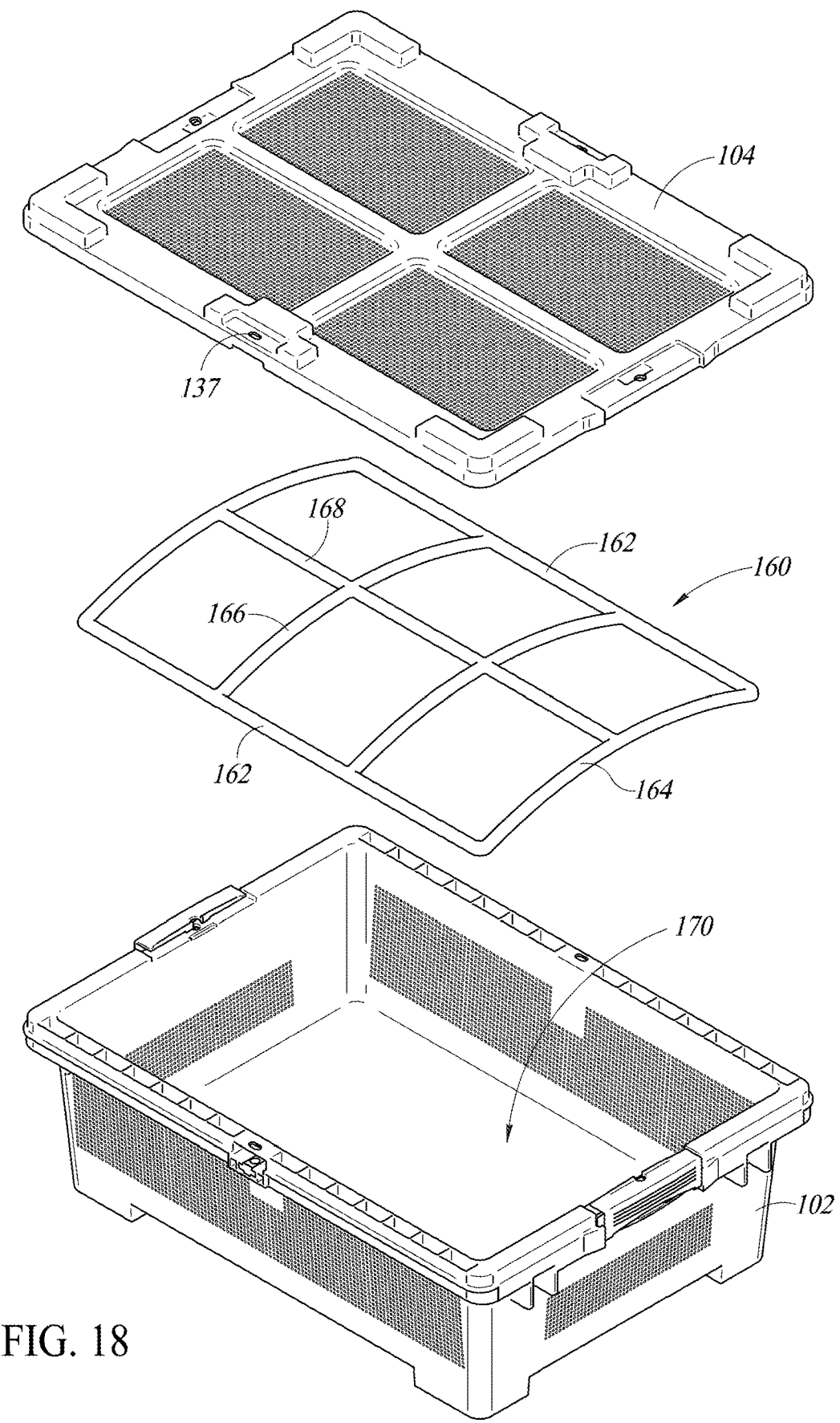
FIG. 18 is an exploded perspective view of a large transport cage for small animals that shows a bird perch to be placed in the interior and lid on top when it closed, the cage providing a high air flow and being stackable according to the embodiment as shown in FIG. 17.

FIGS. 17 and 18 show the cage 100 with the lid 102 removed. As can be seen, the cage body 102 has an opening 170 to hold small animals. The small animals that may be contained therein may include kittens, puppies, snakes, hamsters, mice, guinea pigs, as well as any number of small animals which are routinely shipped by suppliers to pet stores. One particular benefit of the large animal cage is that a plurality of small animals can be shipped within and at the same time. For example, the large animal cage 100 may measure in the range of 2.5 feet to 4 feet in length for the length L1, with a preferred length of 3 feet and have a width W1 in the range of 1.5 feet to 2.5 feet, with a preferred width of 2 feet. A preferred length L3 of the small animal cage is equal to the width W1 of the large animal cage.

As can be seen in the figures herein, when the cages are stacked, the length of the small animal cage at the bottom L4 should be equal to the distance between the inner sidewall 108 of the ridges 106 at the top of the large animal cage. Furthermore, the upper length L3 of the small animal cage should be equal to the total upper width W1 of the large cage 100. In addition, the width W3 of the small cage 200 should be slightly less than half of the length L1 of the large cage 100. The combined width W3 of two cages 200 approximately equals the total length L1 of the large cage 100, minus a clearance space. Since there is a space in between the two smaller cages 200 when they are placed on top of the large cage as stacked, the width W3 is slightly less than half the length L1 in order to provide some spacing between the two cages 200 when they are stacked on top of the large cage 100. The width, therefore, of the small animal cage 200 is slightly less than half 3 feet, namely about 1 foot 5 inches, or 1 foot 5.5 inches, if the length L1 of the large animal cage 100 is 3 feet. This will provide a spacing of approximately 1 inch between the two small animal cages 200 when they are stacked on top of the large animal cage 100. If the length L1 is a different value, then the width W3 of the small animal cage will be slightly less than half that value, by an amount that will leave a small spacing in the range of about an inch between the two small cages 200 when stacked on top of the large animal cage 100.

Returning to FIGS. 17 and 18, the cage 100 can be seen having closing latch 114 at either end, in this position shown is closed. Along the lengthwise extension 122 in the center is an aperture 129 through which the locking tab 130 can be inserted. In addition, an aperture 131 is positioned below the aperture 129 through which the locking tab 130 can be inserted. The aperture 131 can be formed in a sidewall of the cage 102 if desired. Alternatively, in one embodiment, an insert 135 is provided as separate piece that is distinct from the cage body 102. This insert 135 can be seen as a separate piece from the cage body 102 in FIGS. 1, 17 and other figures. This insert 135 can be placed within a recess of the sidewall of the cage body 102. The aperture 131 can extend through this insert 135. In some embodiments, this insert 135 is present and the locking tab 130 can be used. In other embodiments, the insert 135 is not present and there is no aperture 131 in the sidewall of the cage 102, see for example, FIGS. 9-14 and 27-32. In such embodiments, the locking tab 130 is not present.

At one point in time, the large cage 100 is opened and the inside exposed to permit a plurality of different animals to be placed and shipped therein. For example, the large cage 100 is oversized to permit the shipping of five or six small puppies, in the range of 10 to 12 small kittens, or in the range of 12 to 15 hamsters, guinea pigs or other animals. Of course, if the animals are larger, such as partially grown puppies, large kittens, large hamsters, guinea pigs or the like that a fewer number may be placed therein, for example anywhere from one or two small animals, to an average of five or six small animals, and if the animals are quite small, such as smaller hamsters, lizards, mice or the like then perhaps in the range of 15-25 animals may be placed in a single cage 100.

In some embodiments, it is desired to ship birds in the cage 100. If birds are being shipped in the cage 100, they desire to have a perch in order to be positioned thereon. A perch 160 is therefore provided which is placed into the bottom of the cage, inside the opening 170 so that one or more birds may be shipped in the cage 100. The height of the cage 100 is sufficient to permit various canaries, parakeets, and even some parrots to be placed therein. As can be appreciated, the bird should not be taller than the height of the cage 100 when sitting on the perch 160 and therefore, the birds to be shipped thereon would normally be of a size that will provide sufficient clearance between the bird when perched on the perch 160 to not hit their head on the lid 104.

As can be seen in FIG. 18, the perch 160 contains a number of different arches 166 which the bird can perch on. Extending lengthwise along the perch 160 is bottom leg 162 on either side, and end arch 164 extends between the legs 162. A central rib 168 extends from the end arch 164 to the other end arch 164. Central arches 166 can be provided, if desired. Birds traveling therein can therefore perch along the center ridge 168 or, if present, the central arches 166. The curvature of the arches 164 and 166 is selected to be sufficient to provide strength to the perch 160 as well as some clearance for the bird to perch on the perch 160 and have their tail and feet well above the bottom of the body 102 of the cage 100. Since most birds are more comfortable perching at least some distance above the ground in which their feet and their tail does not touch the ground, the amount of arch in the perch 160 will be selected to be sufficiently high that birds expected be shipped thereon, such as canaries, parakeets and the like, will be able to comfortably roost therein without having their feet, tails, or other feathers touch the ground.

The perch 160 is fully separated from the cage 100. It may be placed therein as desired if birds are to be shipped, or may be removed if birds are not to be shipped therein. The cage 100, therefore, is a universal animal shipping cage for small animals, permitting the easy shipment of mammals, such as hamsters, rabbits, puppies as well as shipment of reptiles such as snakes, lizards, and the like, as well as shipment of birds by the insertion of the perch 160.

FIGS. 19-36 illustrate the small cage 200, in particular, specific features about the small cage 200. Many aspects of the small cage 200 are similar to the aspects of the large cage 100 in order to provide ease of reference between the features, the elements of the small cage 200 have a reference number starting with "2" and the remaining two digits correspond to the corresponding elements of the large cage 100. Thus, the description of similar items of the large cage, such as ridge 106 and lid 104, etc., can be carried over to corresponding features in the small cage, such as the ridge 206 and the lid 204.

Figure 19:
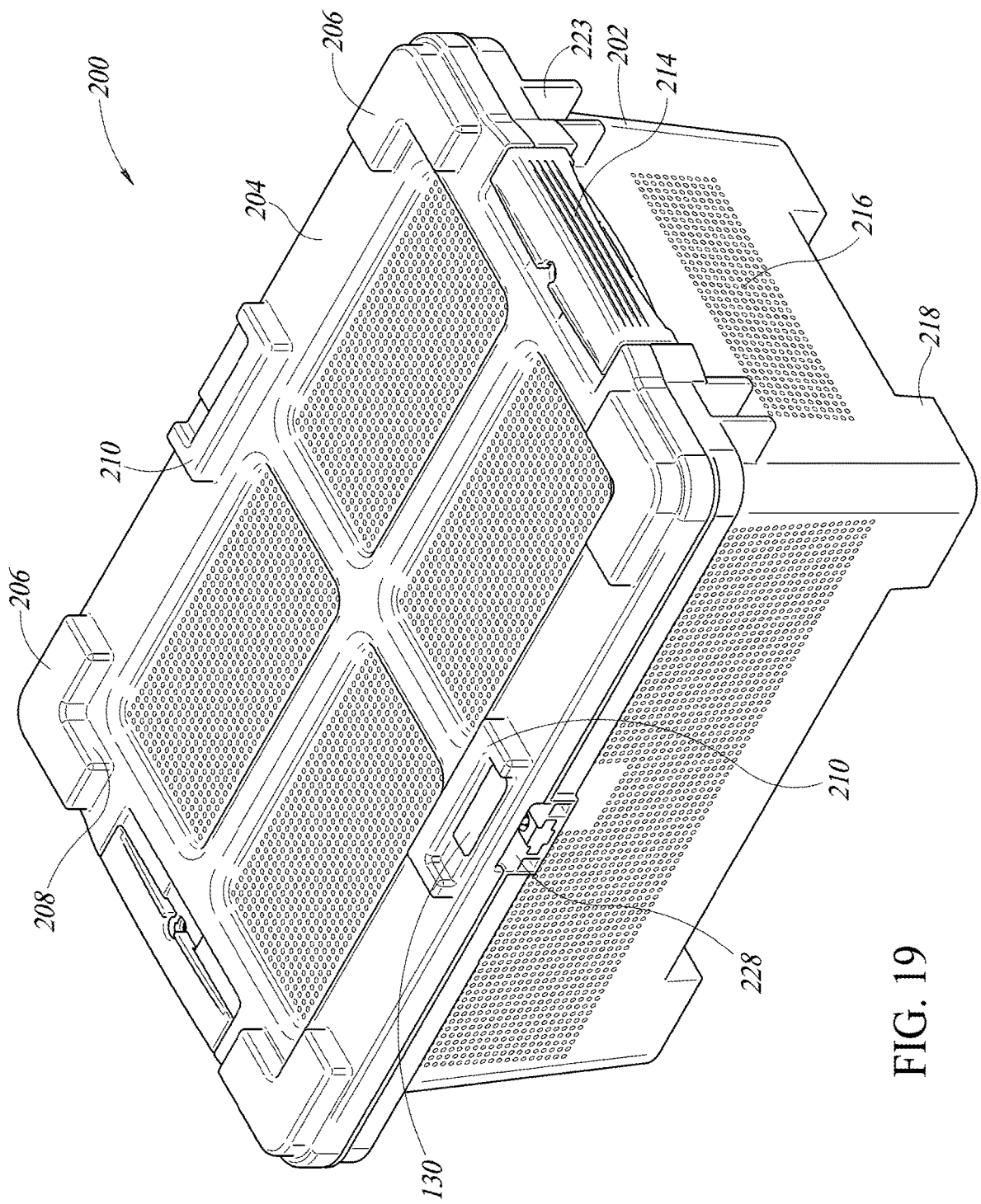
FIG. 19 is a top perspective view of a small transport cage for small animals providing a high air flow and being stackable showing one embodiment.
Figure 20:
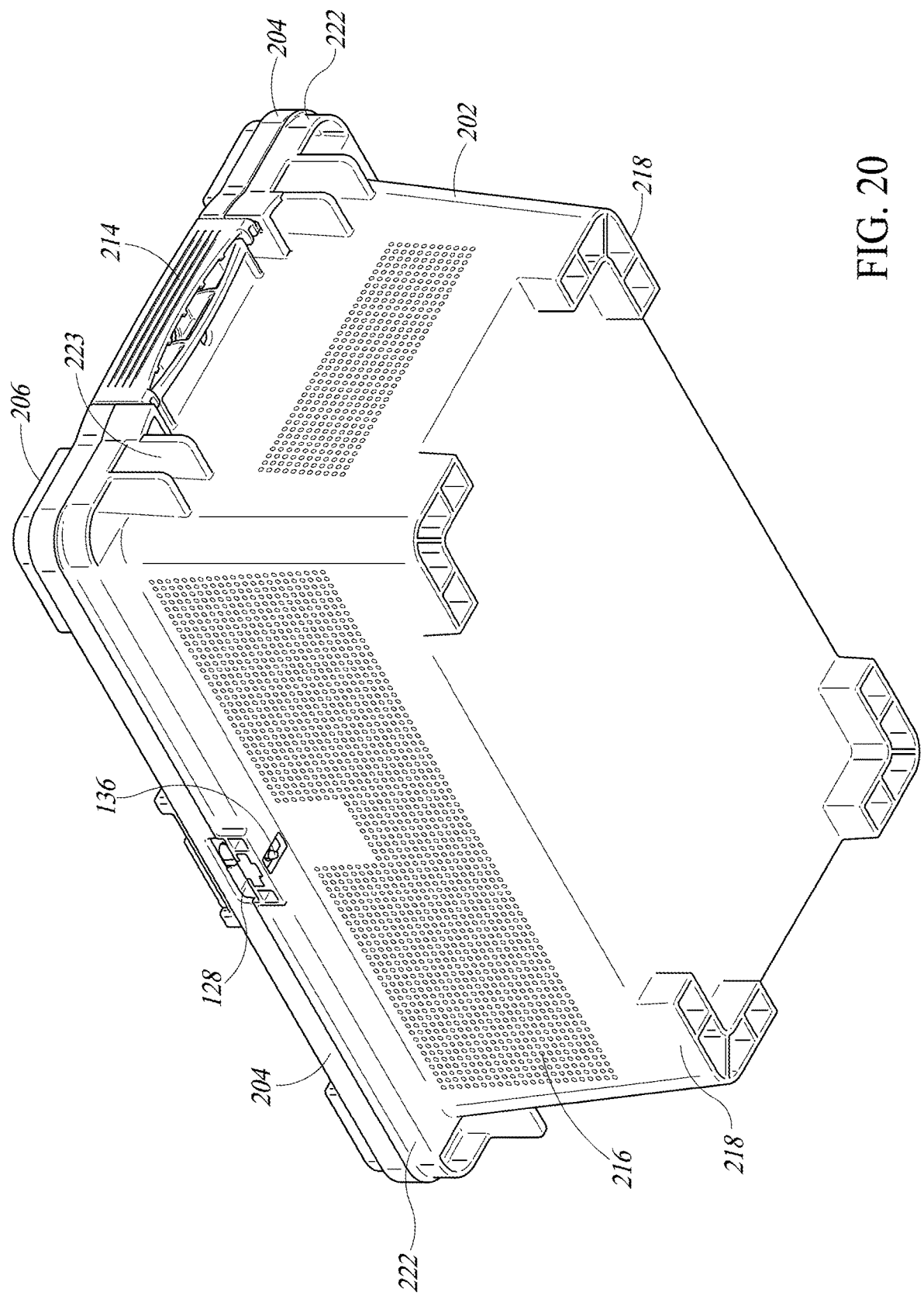
FIG. 20 is a bottom perspective view of the embodiment of FIG. 19.

Viewing in detail the small cages shown in FIGS. 19 and 20, it can be seen that it includes the cage body 102 and a lid 204. The lid 204 has ridges 206 in each of the four corners, and the inner side walls 208 of the ridges 206 are positioned to receive either the legs 218 of another small cage 202 on top thereof, or the legs 118 of a large cage 100 positioned on the top thereof, as explained in more detail labels elsewhere herein. In the central region of the lid 204 is a center ridge 210 which includes a recess in which the locking tab 130 is placed. The center ridge 210 of the small cage 200 is not expected to have the legs of any other cage on top of it, whether a small cage 200 or large cage 100 and therefore does not have an inner corner side wall to receive such legs. This is to be contrasted with the lid 104 of the large cage which has an inner corner side wall 112 in order to receive the legs 218 in a snug position against both sides of the sidewall of the leg 218 to assist in holding it in a firm position.

The small cage has an opening 228 between the lid 204 and the cage body 202 so that the locking tab 130 may be easily seen and accessed as explained in more detail later herein. Further, the cage has a number of air holes 216 to provide a good flow of air for the animals to breathe when shipped therein. An extension 222 at the top of the cage body 202 extends out from the cage body a sufficient length to equal the length of the lid 204. The extension 222, like the extension 122 in the cage 100 has a rib 223 extending below along the sidewall of the cage body 202. The ribs 123 and 223 have at least a few different purposes and functions. A first function of the ribs is to provide strength to the extension 122 and 222, respectively. Another purpose of the ribs is to provide strength to the cage body 202, yet another purpose of the extension is to provide spacing between the cages when vertically stacked inside of each other. Specifically, with the lid 204 removed, and conversely with the lid 104 removed from the large container 100, the cages may be stacked inside of each other. This is a convenient way for shipping them empty and substantially save space when shipping a large number containers that are empty. According to this technique, multiple cages 202 are stacked together with the cage bodies 202 all stacked one inside the other. None of these cage bodies 202 have a lid thereon. Off to the side, and a separate position the corresponding number of lids 204 our shipped. Thus, when the cages are being shipped empty, with no animal store then such as prior to the first use or after being used, multiple cages can be easily stacked, nested one inside the other and the ribs 123 and 223 will assist to keep the cages slightly spaced apart from each other so that they do not become wedged and overly compressed when being shipped. Thus, the ribs 123 and 223 extend sufficiently far out that they align with the extension top 122 and 222, respectively, in order to hold each of the cages a slight distance above the cage in which it is stacked in a nested position.

Figure 21:
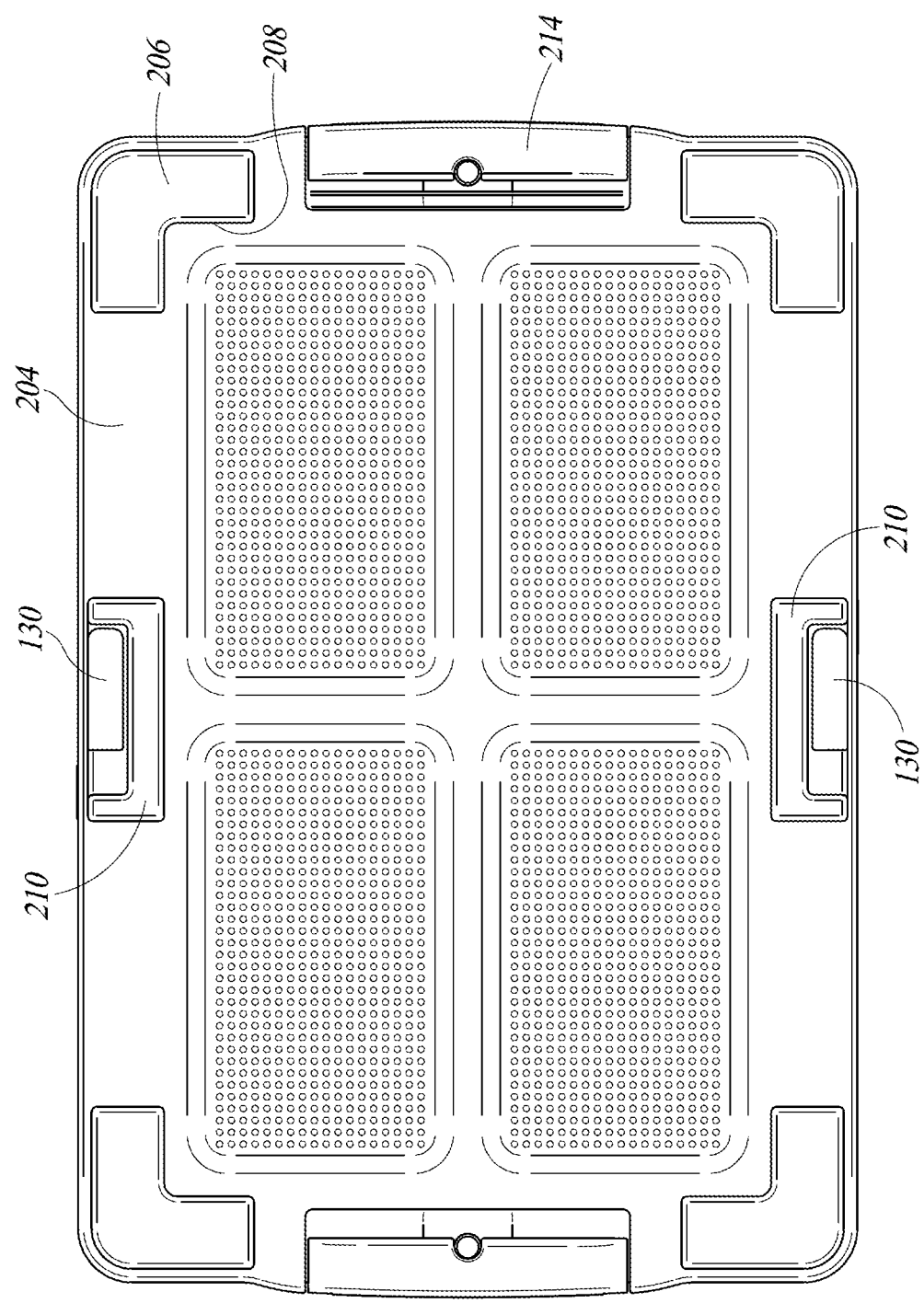
FIG. 21 is a top plan view of the embodiment of FIG. 19.
Figure 22:
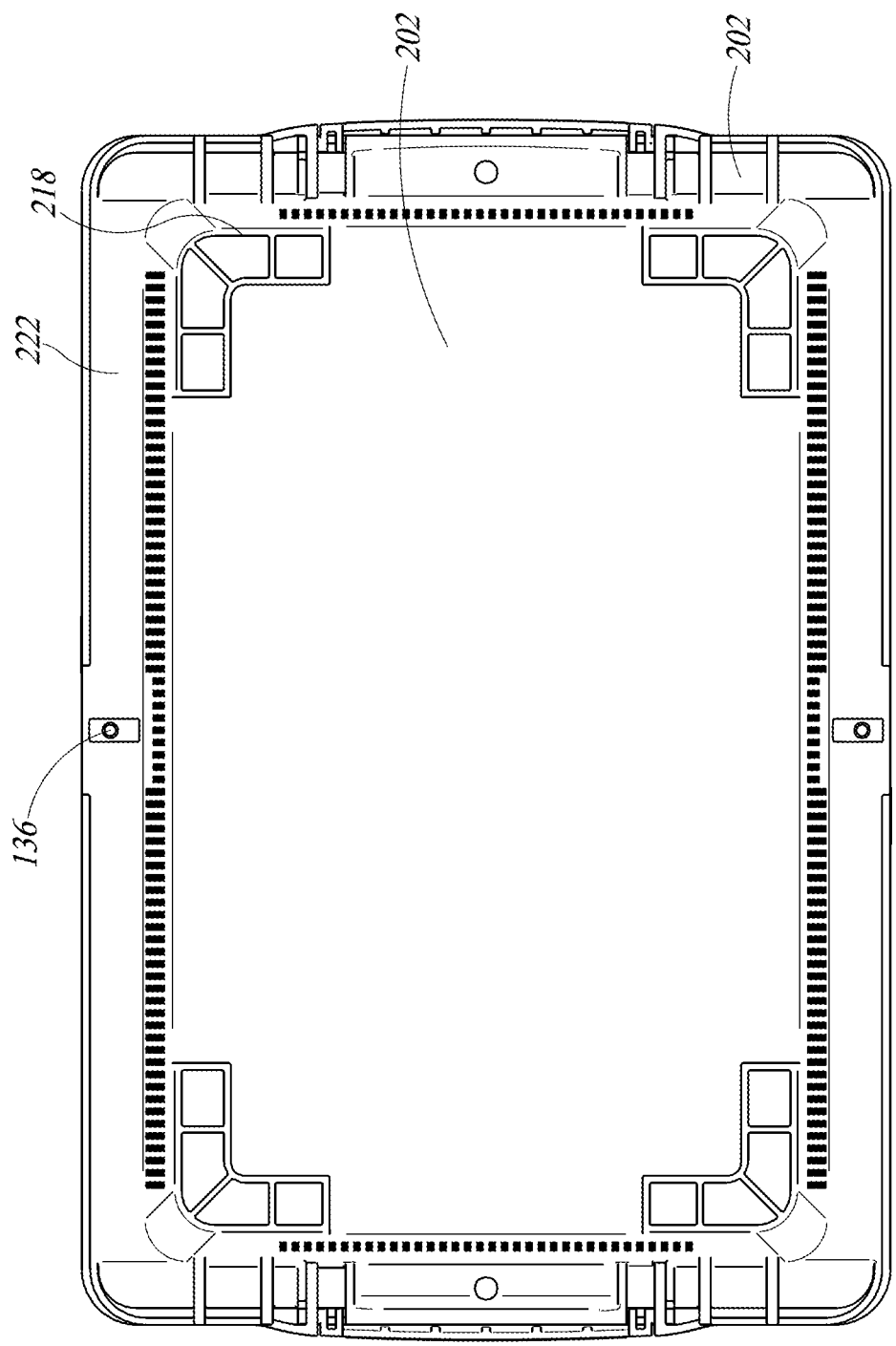
FIG. 22 is a bottom plan view of the embodiment of FIG. 19.

FIG. 21 shows a top plan view of the small cage 200, showing the lid 204, the ridge 206 the inner corner side wall 208 as well as the tab 130. FIG. 22 shows the bottom view of the small cage 200 in which the legs 218 can be seen from the bottom, as well as the extension 222 and the body 202. The tip 136 of the locking tab 130 can also be seen.

Figure 23:
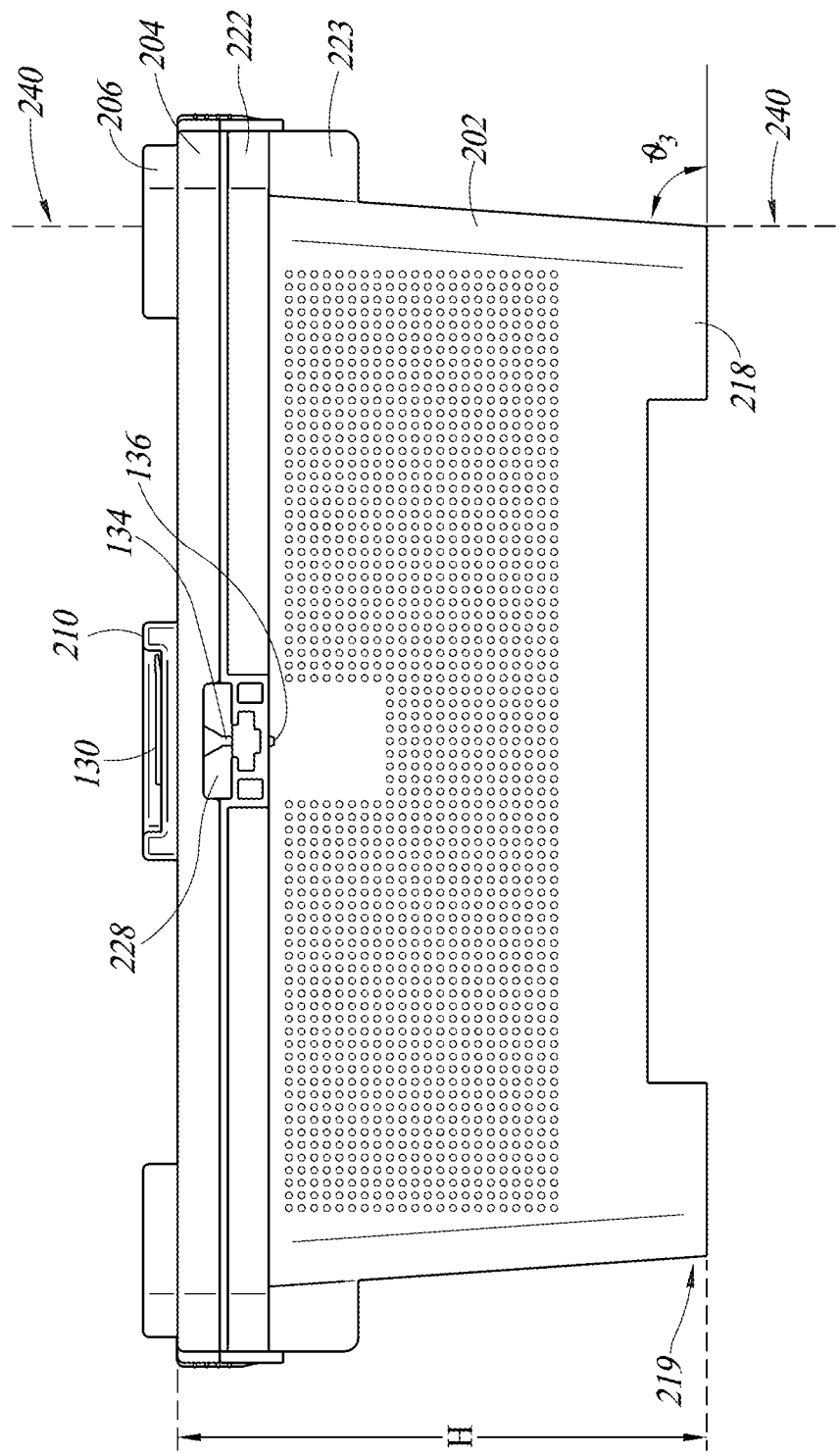
FIG. 23 is a right side elevation view of the embodiment of FIG. 19.
Figure 24:
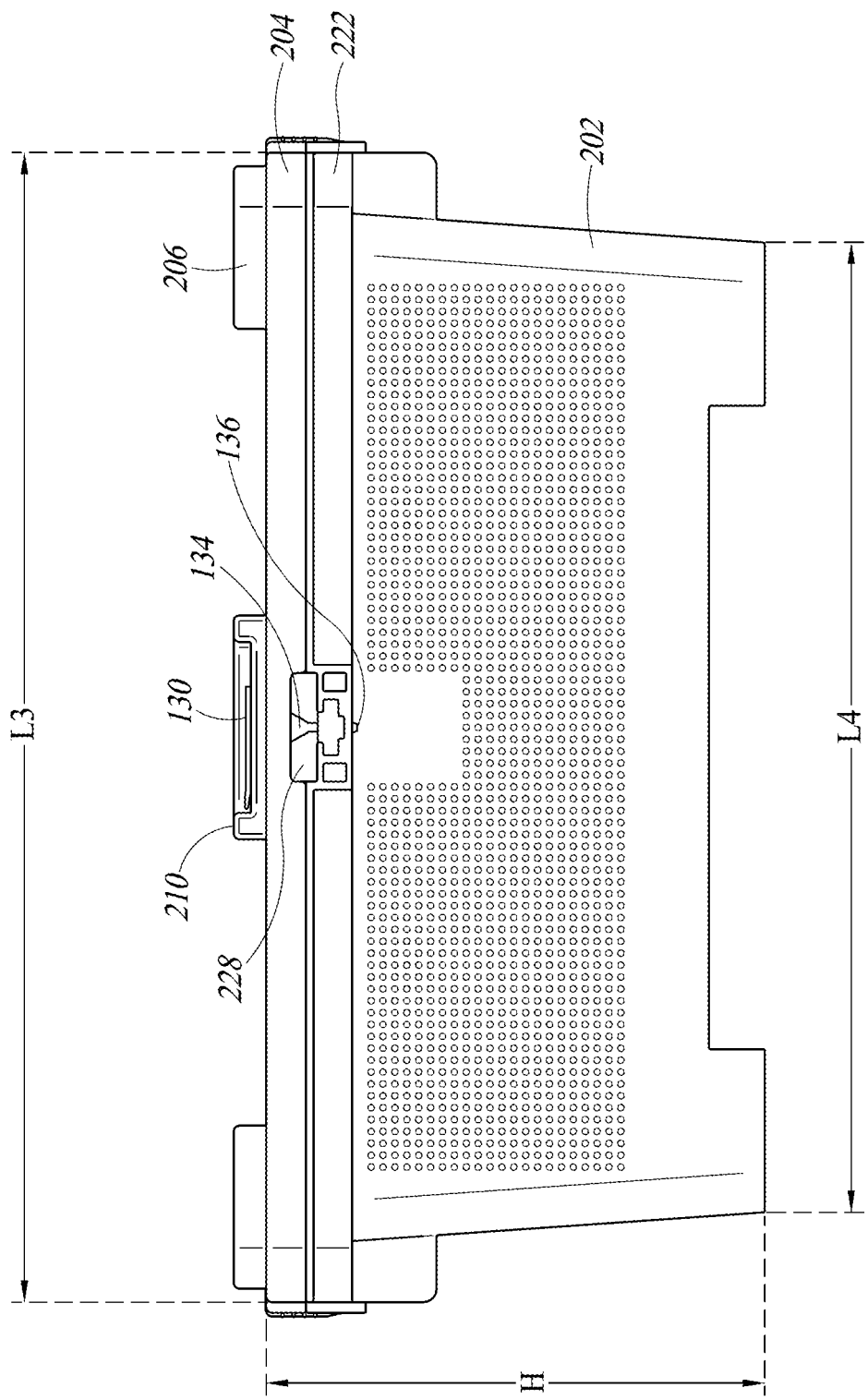
FIG. 24 is a left side elevation view of the embodiment of FIG. 19.
Figure 25:
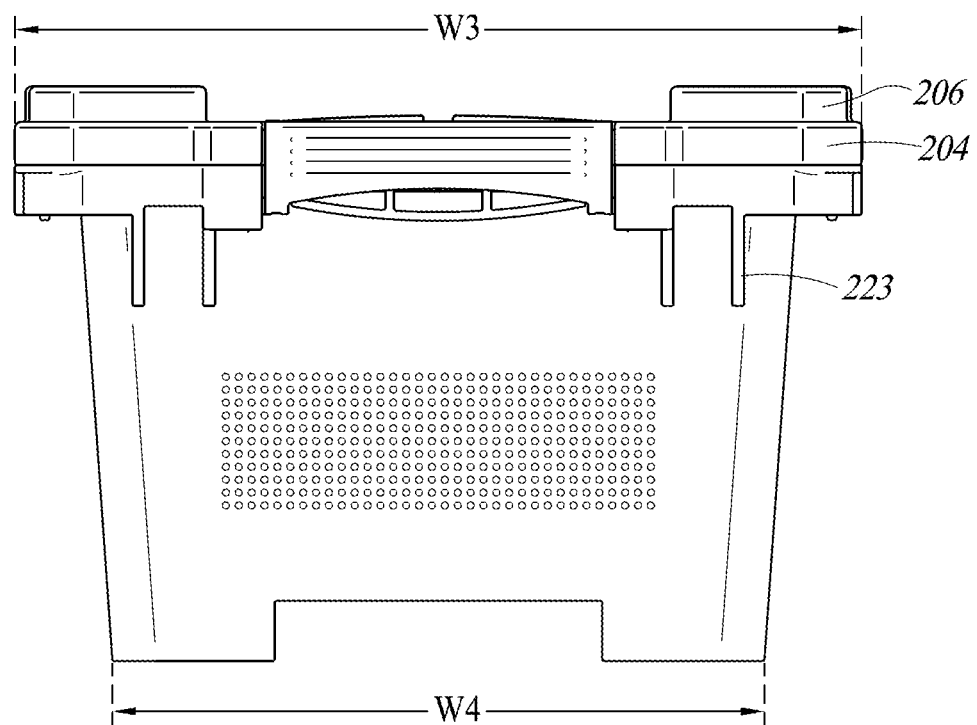
FIG. 25 is a front elevation view of the embodiment of FIG. 19.
Figure 26:
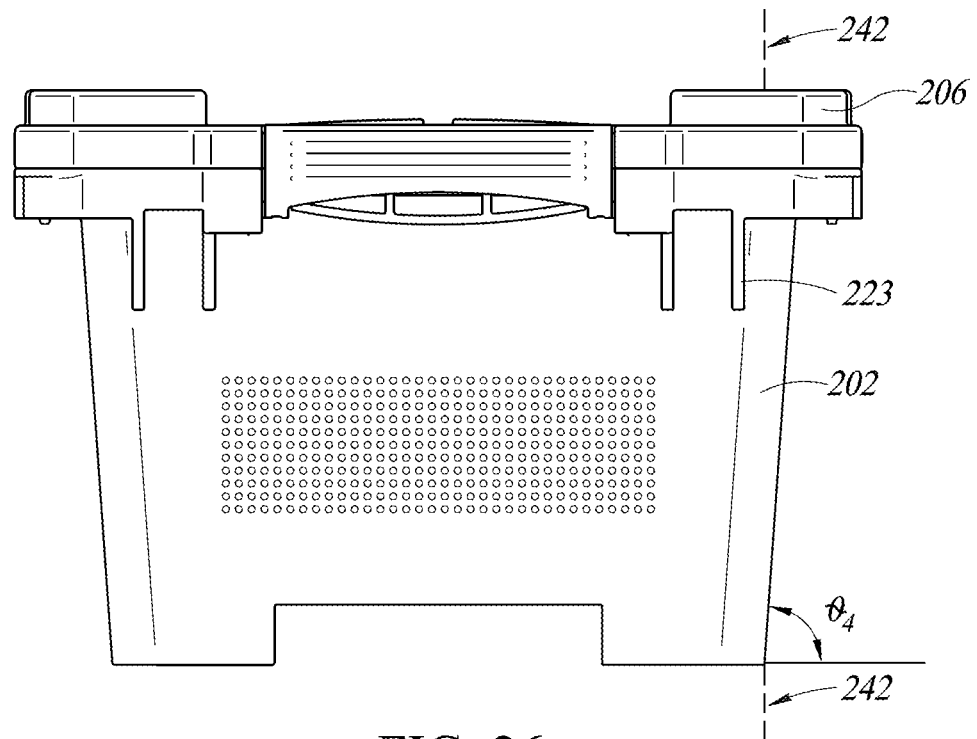
FIG. 26 is a rear elevation view of the embodiment of FIG. 19.

FIGS. 23 and 24 are left and right side views of the small cage 200 showing that the cage has a height H, not including the ridge 206 on the top thereof. The leg 218 has an outer surface 219, and a - - - line 240 extends vertically from the outer surface 219 to be aligned with the inner sidewall 208 of the ridge 206 as can be seen in FIG. 23. Explained elsewhere herein, this facilitates the outer surface 219 being nested in the corner of the ridge 206 in abutting contact with the side wall 208. A locking tab 130 is shown in the recess of the upper ridge 210. The locking tab 130 has a shaft 134 that extends through an aperture in the cage body 202 and an opening 228 is provided so that the locking tab 130 can be easily seen and, as described elsewhere herein, severed or cut in order to release the lid 204. As also shown, in FIG. 24 the top of the small cage 200 has a length L3 extending from side to side, not including the closing latches 214 and the bottom has a length L4 extending from side to side across the bottom. It has a total height H including the lid 204. The angle of the outer surface 219 of the body 202 extends upward an angle $\theta_3$, which can be the same or a different angle from that shown and described with respect to the large cage 100 in FIG. 6. Preferably, the angles are the same for the large cage and the small cage because they will both have the same height. In some embodiments, if the small cage 200 is shorter than the large cage 100 then the angles $\theta_3$ and $\theta_4$ may be different in order to ensure that the width of the large cage approximately equals the length of the small cage, taking into account the thickness of the ridge 106 so that the legs 218 of the smaller cage may nest in the ridges 106 of the large cage when placed on the top thereof. FIGS. 25 and 26 are end elevation views of the small cage 200, showing that it has a width W3 at the top and width W4 at the bottom. The width W4 is selected to be equal to the distance from the inner sidewall 108 of the tab 106 to the central ridge 110 having the inner sidewall 112. Accordingly, the legs 218 will be nested into and firmly abut against the inner side walls 108 of the two outer ridges 106 and the inner side walls 112 of the central ridge 110. The width of the small cage 200 therefore extends along the length of the large cage 100, but is somewhat less than half of that length. The length of the small cage 200 extends along the width of the large cage 100, to align the legs 218 to nest in the outer ridges 106 and about the outer surface of the corner 108 and the lengthwise direction as well, contacting the two ridges 106 in the lengthwise direction of the smaller cage 200. The other two legs 218 in a similar fashion abut against the central ridge 110 in contact with the inner surface 112 of the central ridge 110.

As can be seen in FIG. 26, a - - - line 242 vertically aligns with the outer surface 219 of the leg 218 and with the inner sidewall 208 of the ridge 206. This alignment ensures that the small cages 200 can be stacked on top of each other as explained later herein. The sidewall 219 extends upward at an angle $\theta_4$ as shown in FIG. 26.

Figure 27:
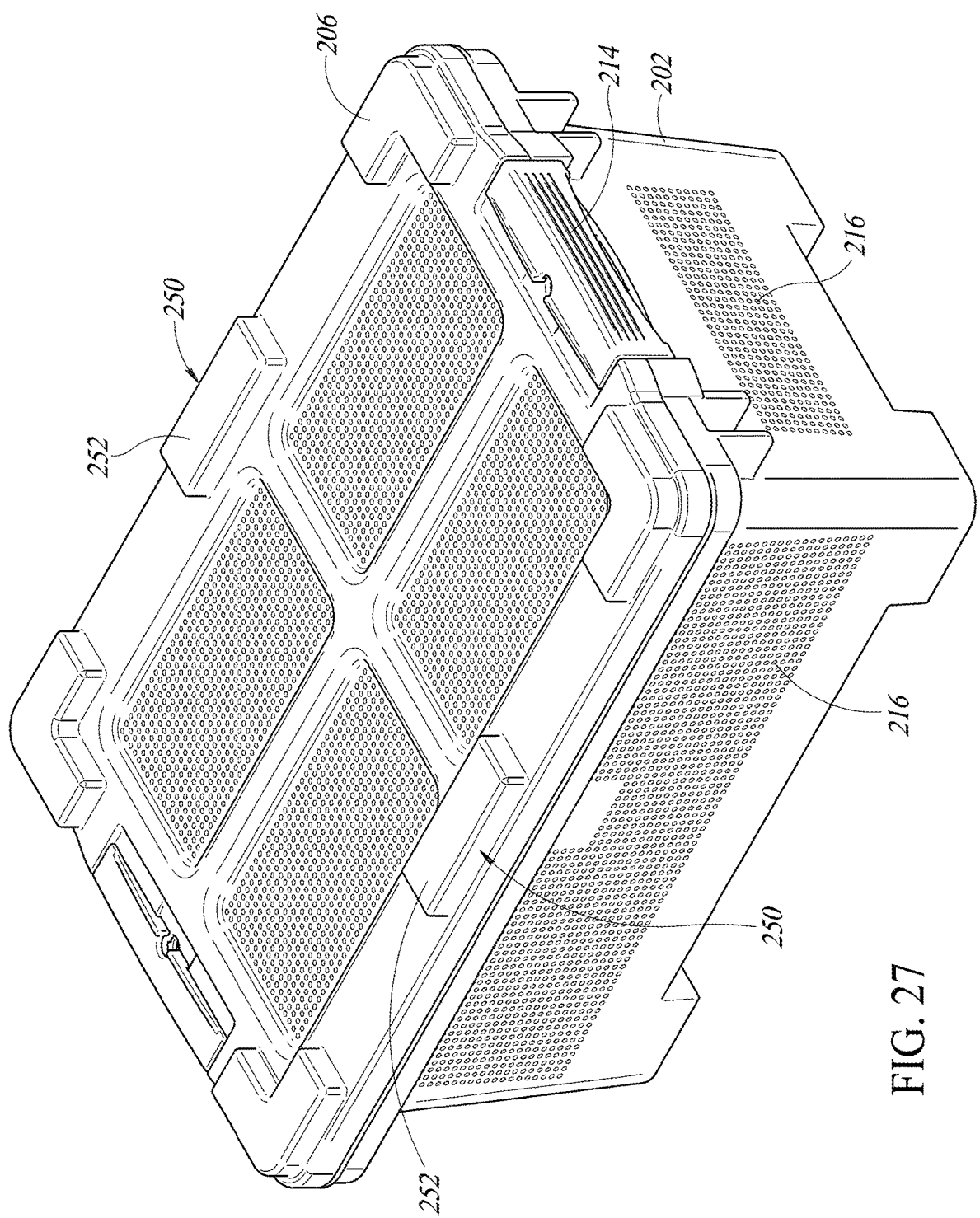
FIG. 27 is a top perspective view of a small transport cage for small animals providing a high air flow and being stackable showing an alternative embodiment.
Figure 28:
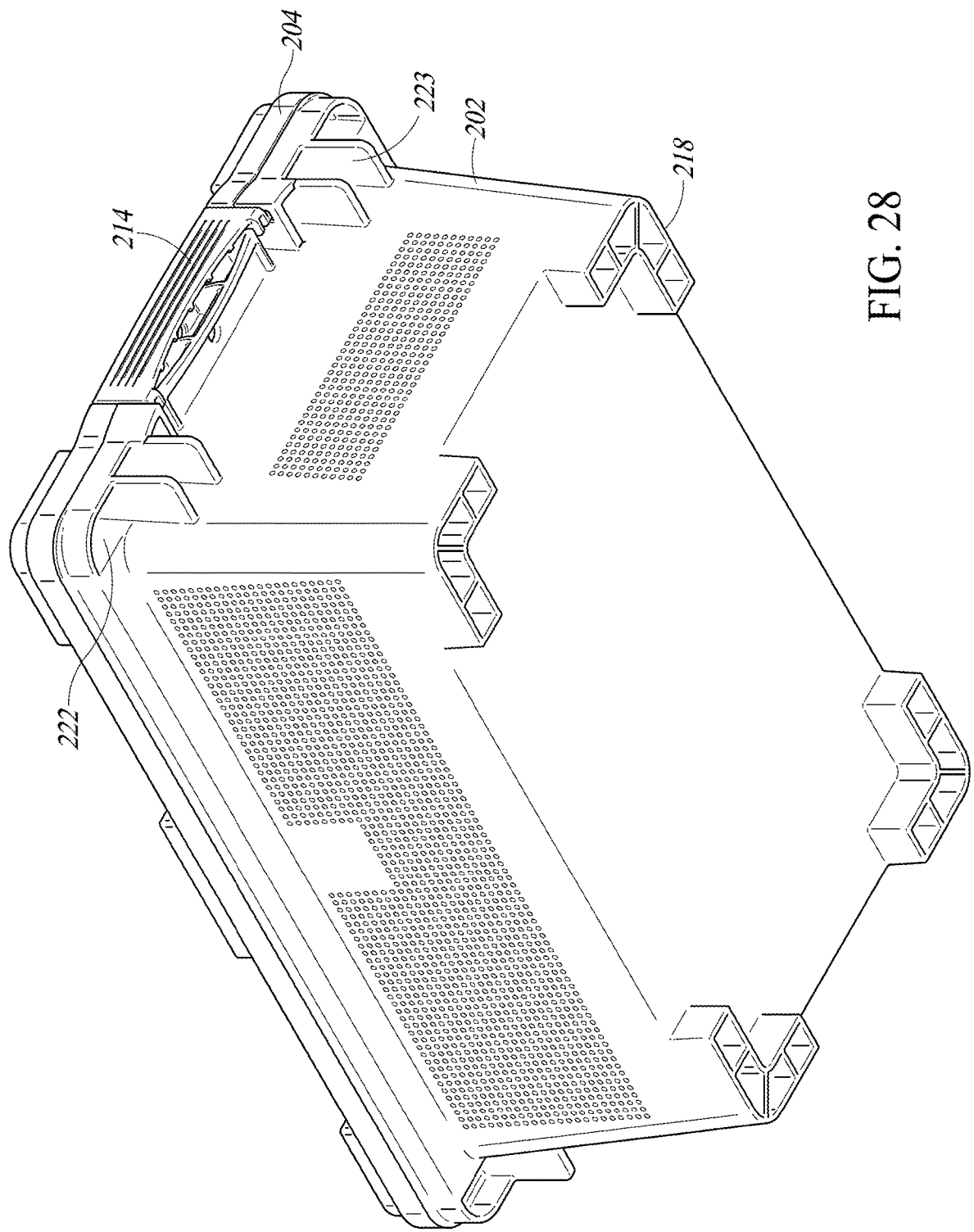
FIG. 28 is a bottom perspective view of the embodiment of FIG. 27.
Figure 29:
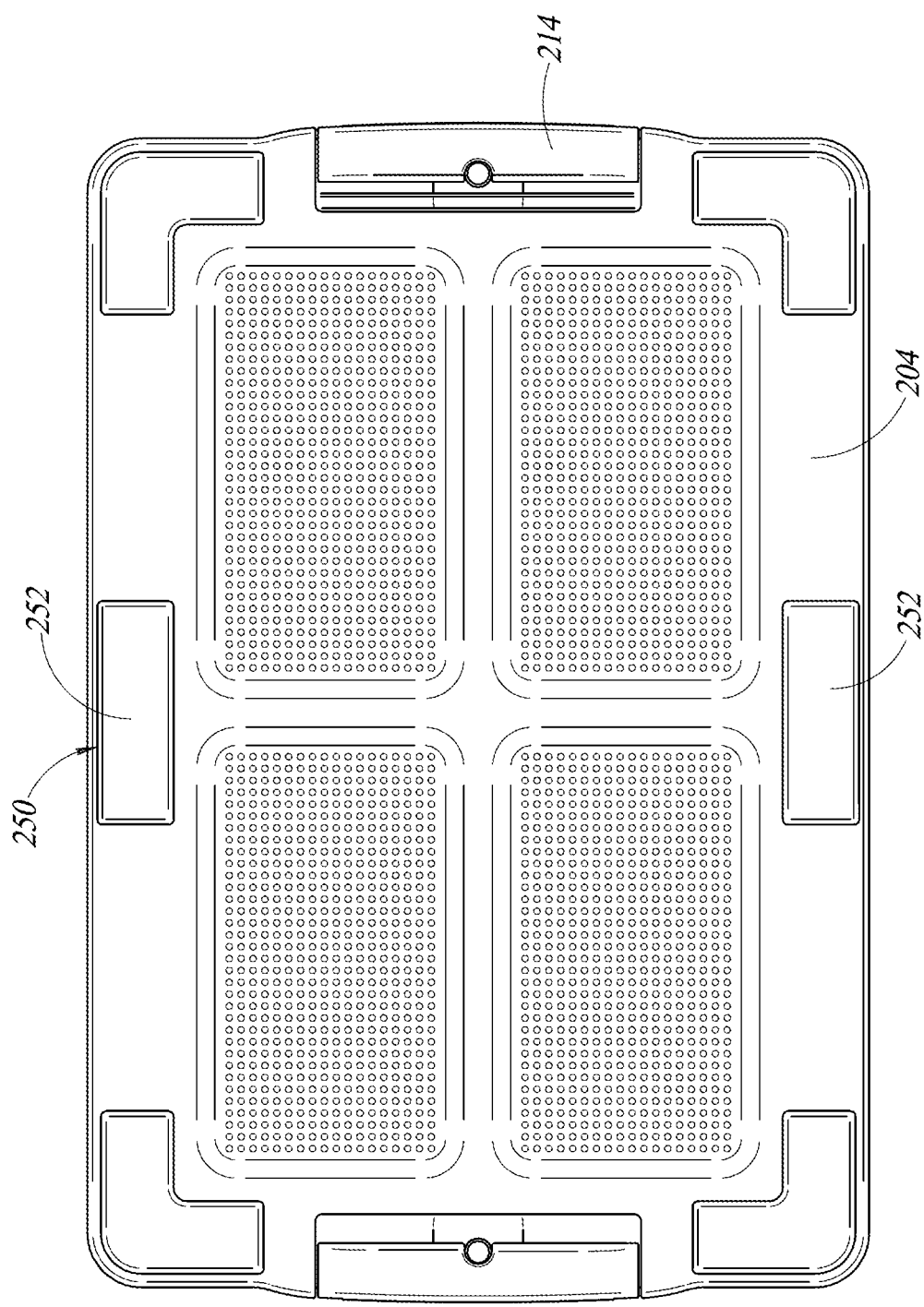
FIG. 29 is a top plan view of the embodiment of FIG. 27.

FIGS. 27-34 correspond to FIGS. 19-26 but shows an embodiment without the locking tab 130. Corresponding features have the same reference numbers in the FIGS. 27-34 and therefore will not be repeated here to save space. A relevant difference between the embodiments is that the lid 204 of FIGS. 27-34 has the center ridge 252 which has a continuous outer surface 250 thereon. There is no recess in the central ridge 252 to receive the tab 130 which can perform a safety locking mechanism. FIG. 27 shows a top isometric view of the alternative embodiment of the small cage 200 without the locking tab. FIG. 28 shows a bottom isometric view of FIG. 27. FIG. 29 shows a top plan view in which the central ridge 252 can be seen with the smooth sidewall 250.

Figure 30:
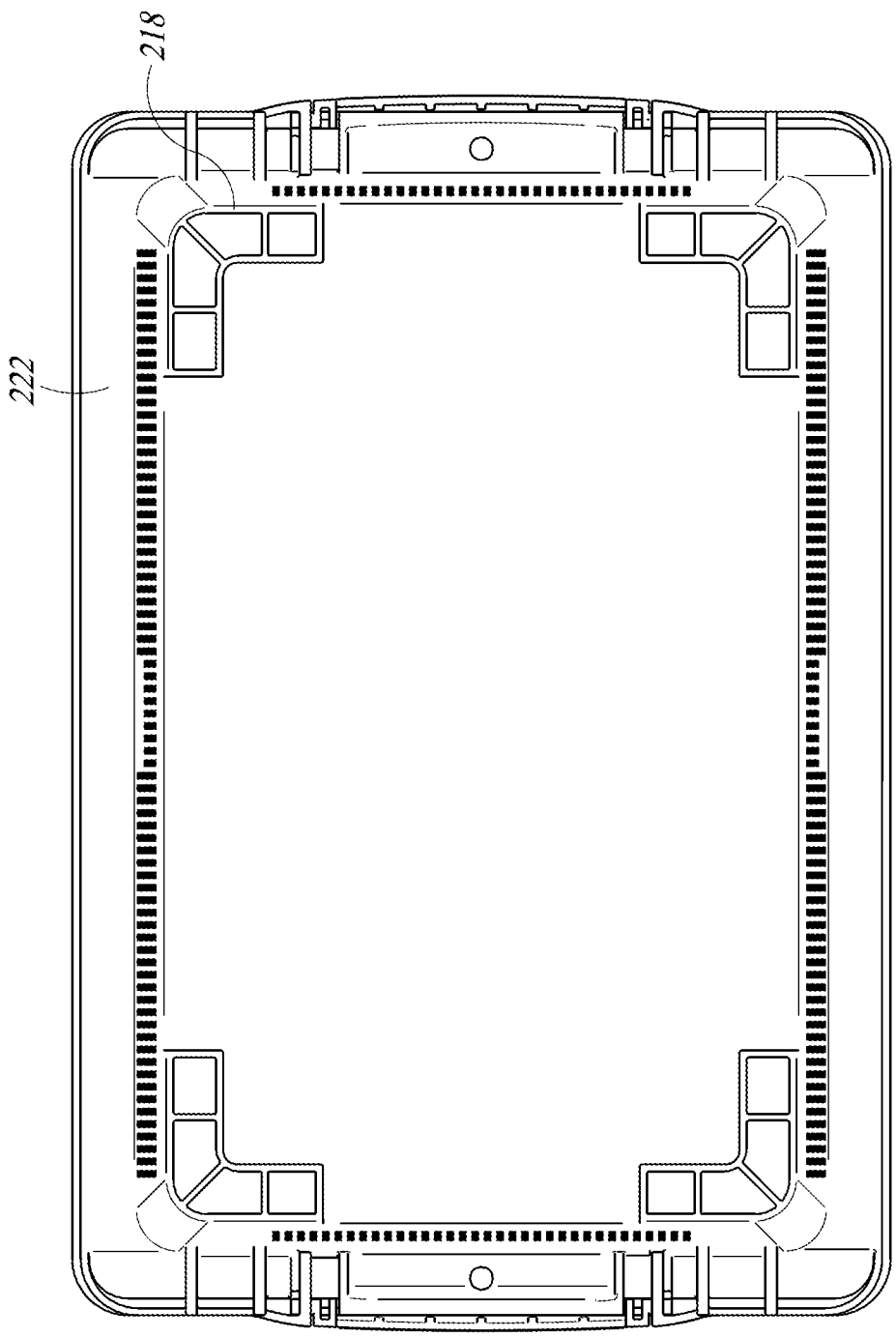
FIG. 30 is a bottom plan view of the embodiment of FIG. 27.
Figure 31:
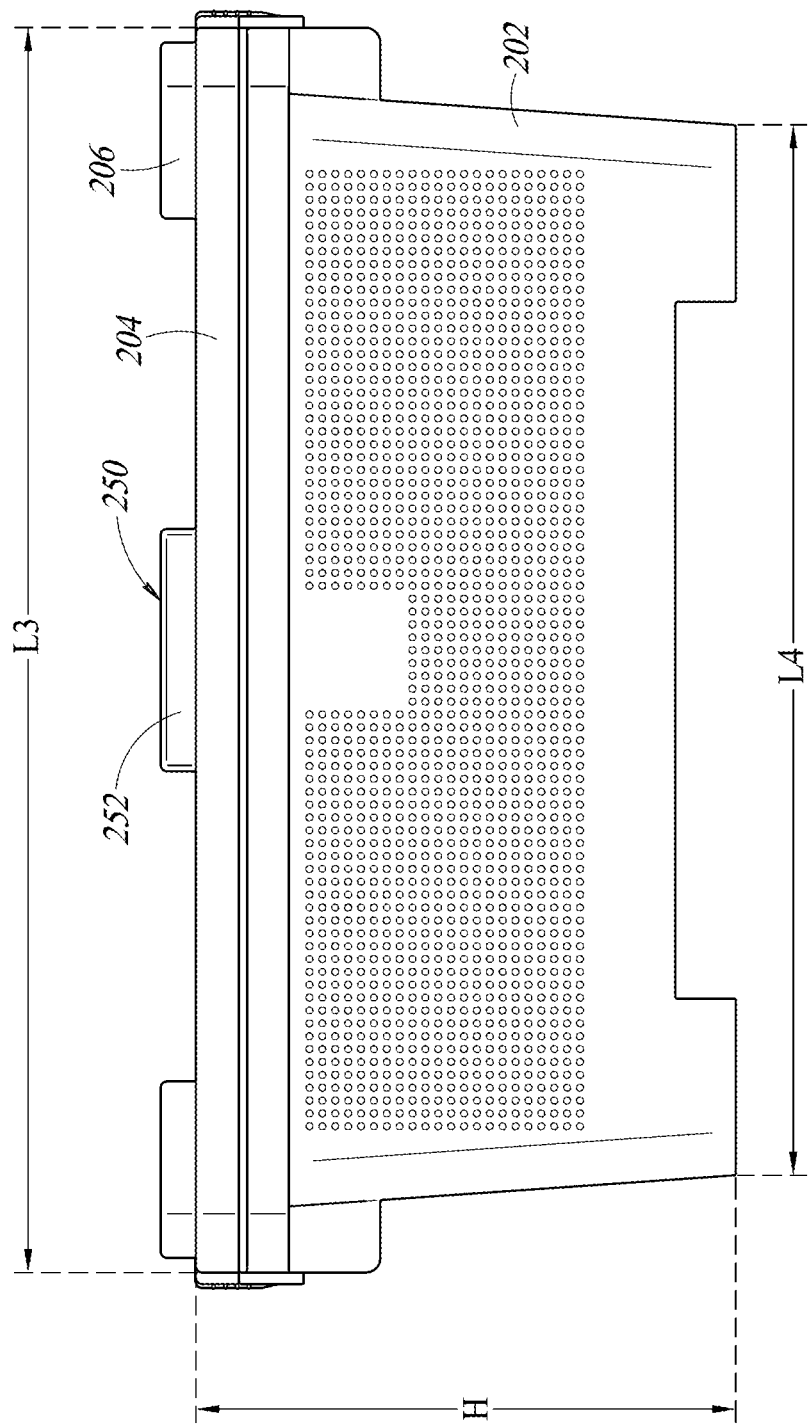
FIG. 31 is a right side elevation view of the embodiment of FIG. 27.
Figure 32:
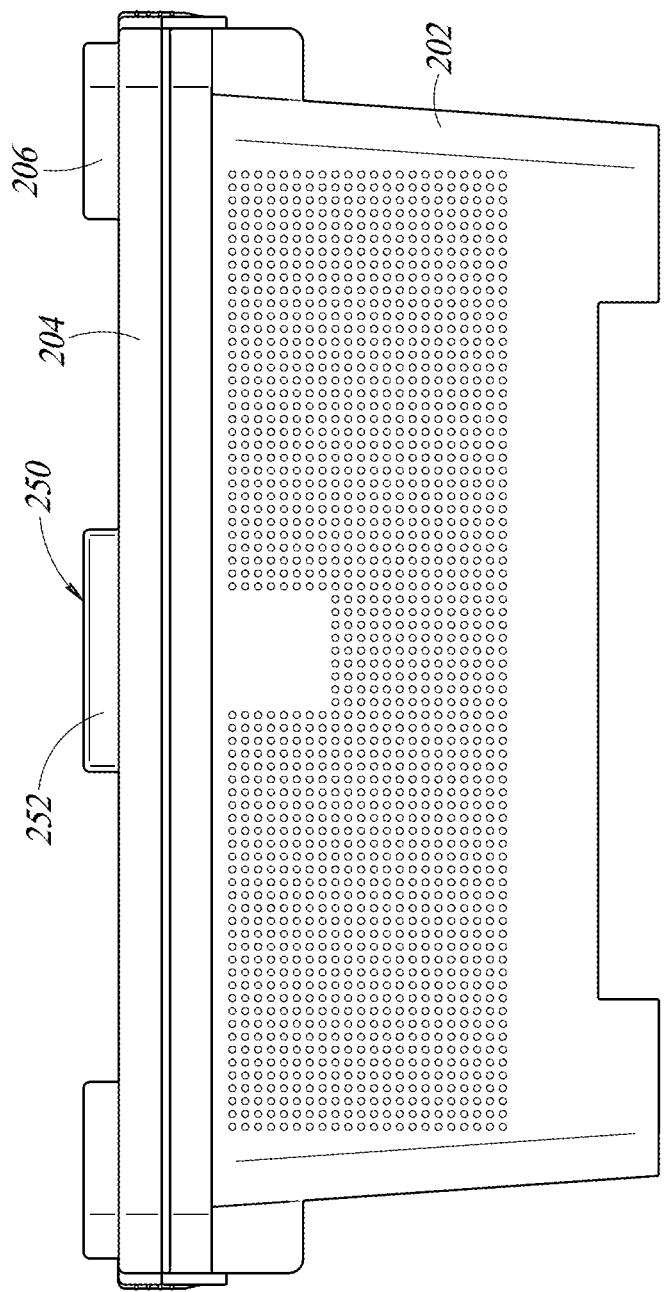
FIG. 32 is a left side elevation view of the embodiment of FIG. 27.
Figure 33:
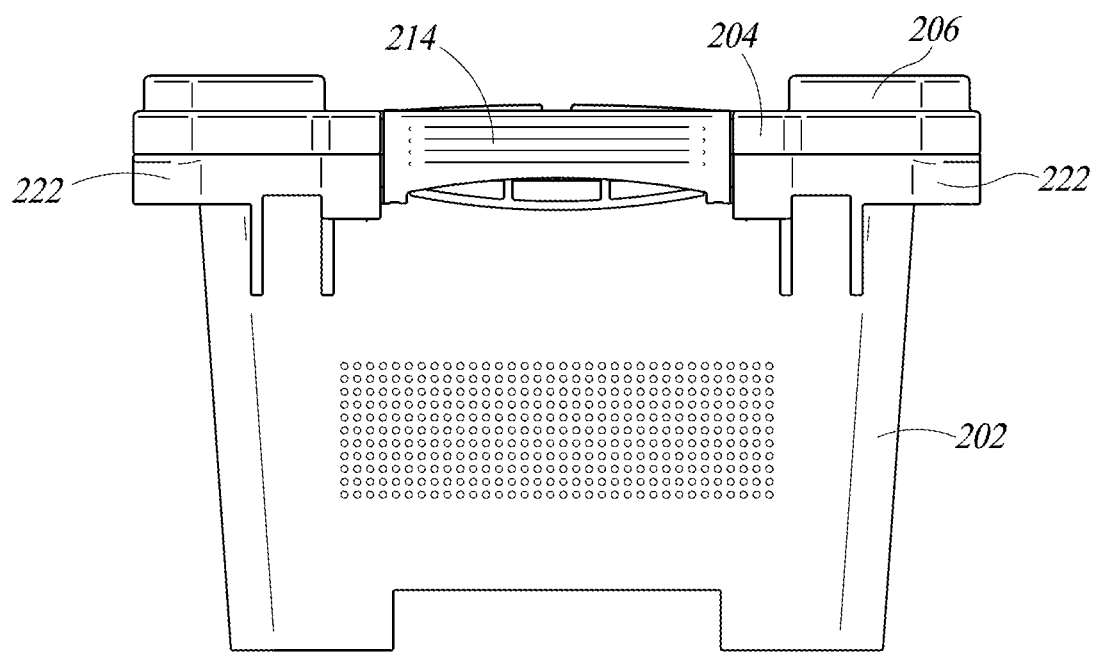
FIG. 33 is a front elevation view of the embodiment of FIG. 27.
Figure 34:
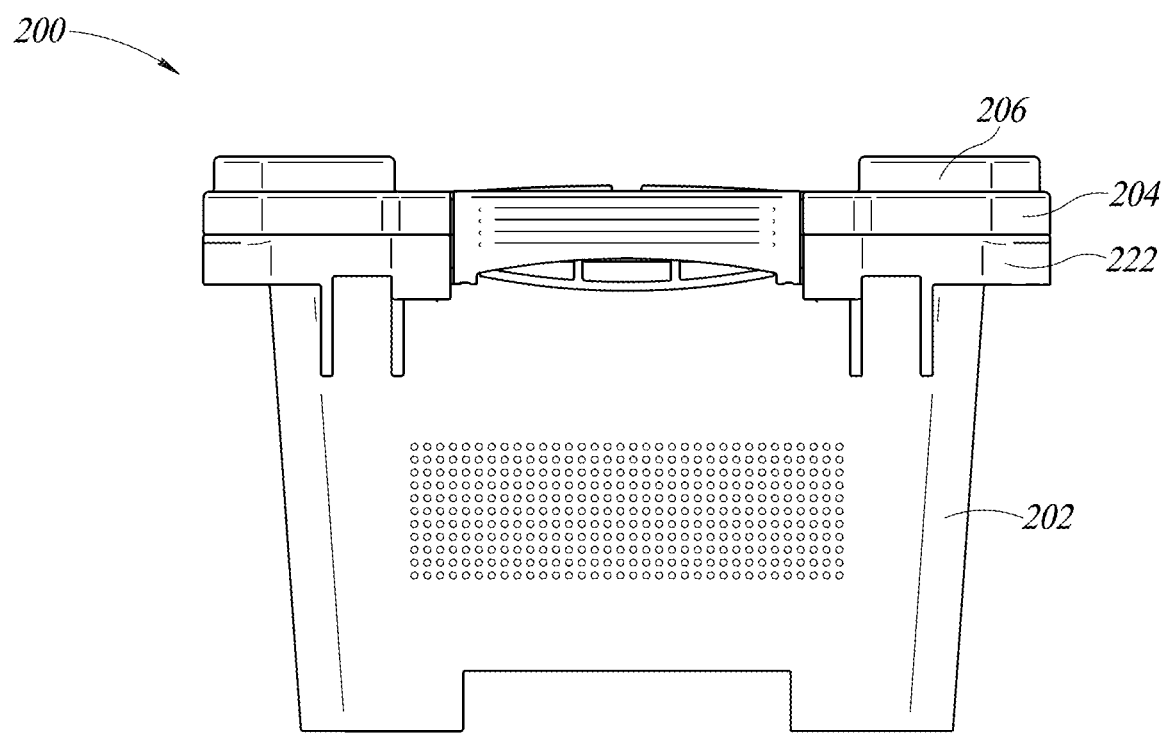
FIG. 34 is a rear elevation view of the embodiment of FIG. 27.

In one embodiment, the raised ridge 252 is not present. Instead, the lid 204 extends in a smooth, uninterrupted path from the corner ridges 206 along the entire length of the lid 204. The ridge 252 is not required in order to receive the legs of any cage that will fit on top of it because a small cage 200 can receive the legs of a small cage 200 only at its corners and in addition, can also receive a large cage 100 only at its corners. Thus, while a large cage 100 can receive a cage in either the central region or the corners or both, the small cage can only receive the legs of a cage on top of it at its corner ridges. Therefore, in one embodiment this central ridge 252 is not present. FIG. 30 is a bottom view showing the leg 218 and the extension 222. FIG. 31 is a side view showing the height H of the alternative embodiment, the length L3 of the top and the length L4 of the bottom extending from the legs 218 on one side to the legs 218 on the other side. FIG. 32 is a side elevation view of the other side of the cage 200. FIGS. 33 and 34 are in views of the small cage 200 according to the alternative embodiment.

Figure 35:
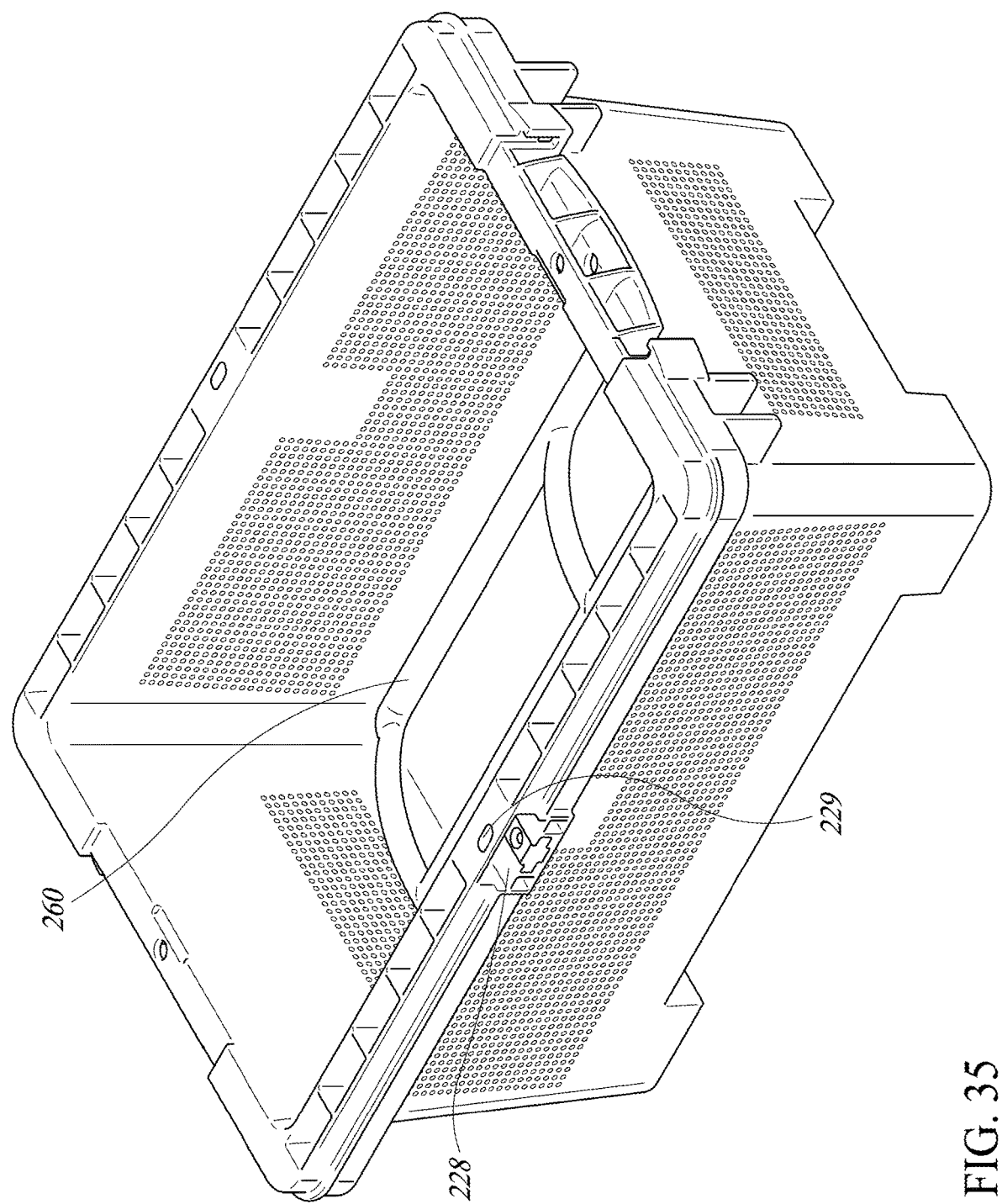
FIG. 35 is a top perspective view of a small transport cage for small animals that includes a bird perch in the interior and also provides a high air flow and being stackable with the lid not present, according to the embodiment of FIG. 19.
Figure 36:
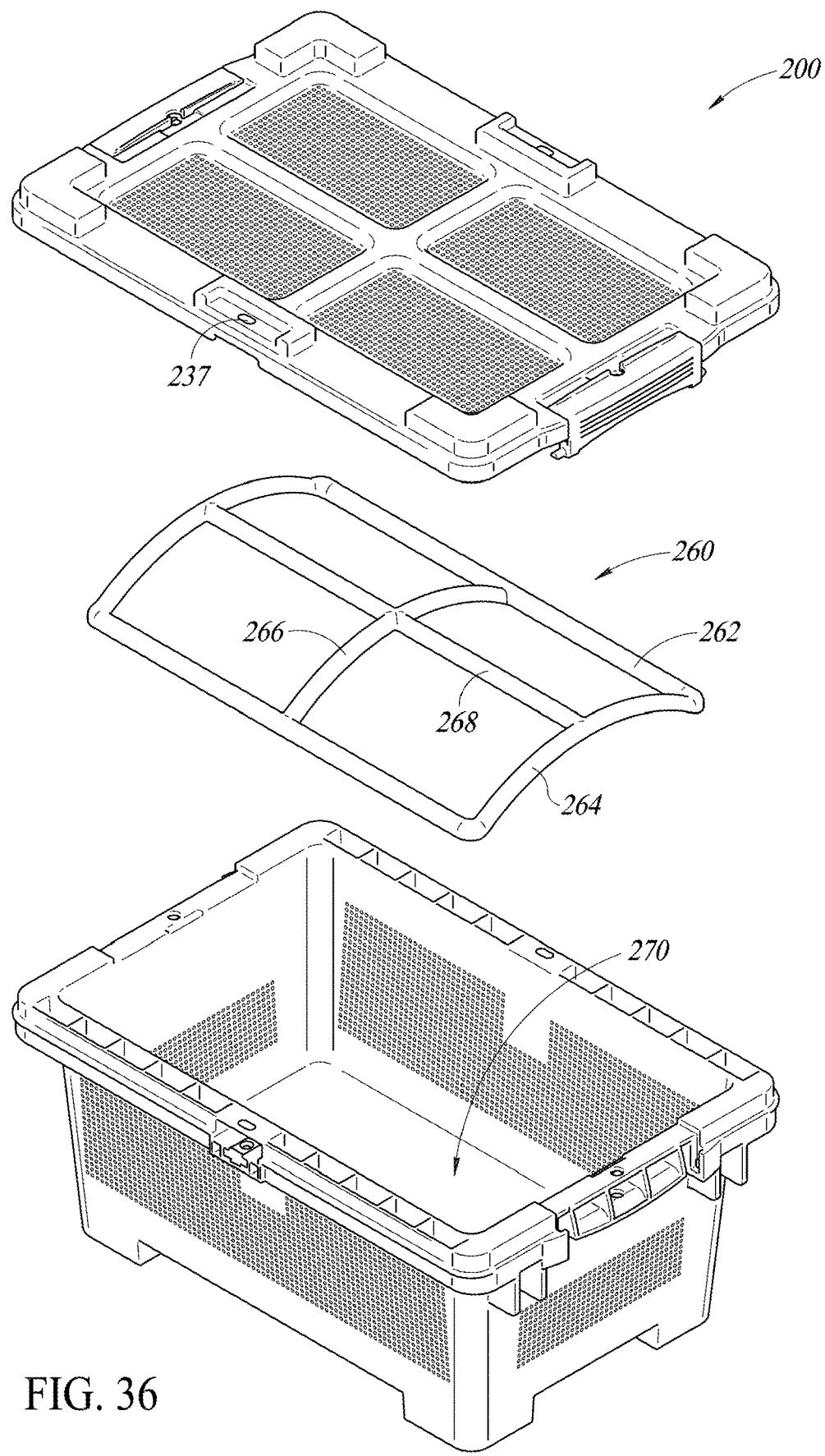
FIG. 36 is an exploded perspective view of a small transport cage for small animals that shows a bird perch to be placed in the interior and lid on top when it is closed, the cage providing a high air flow and being stackable according to the embodiment as shown in FIG. 35.

FIGS. 35 and 36 show the small cage 200 having the lid 204 removed so that the central cavity 270 can be seen. In addition, according to one embodiment a bird perch 260 is positioned inside of the small cage 200. As can be seen in FIG. 35, an aperture 229 is provided along the side wall of the upper extension 222 of the cage body 202 to receive the locking tab 130 as explained elsewhere herein. Viewing FIG. 36, the small cage 200 can be seen with the bird perch 260 ready to be positioned therein. The bird perch 260 includes legs 262 that extend lengthwise and have an end arch 264 and between them, connecting them to each other. A central ridge 268 extends lengthwise at the highest points of the arch 264. A central arch 266 extends from one leg 262 to the other leg 262. The bird perch 260 can be placed inside the small cage 200 when smaller birds are being shipped, for example canaries, parakeets, lovebirds, and other types of smaller birds. In some instances, smaller parrots may also be shipped herein. The birds can perch on the center ridge 268 or the arch 266 when they are being carried in the cage 200.

FIGS. 37-41 illustrate how the cages may be stacked on top of each other in various configurations. One of the inventive features of the combination of the large cages 100 and the small cages 200 is that the large cages 100 can be stacked on top of each other to a height of at least six cages, and in some instances eight cages with each of the large cages been stacked on top of each other. In addition, the small cages may be stacked on top of each other with a single column of small cages stacked six or eight cages high and be in a stable position. In addition, the small cages may be stacked into three or more columns side by side with only small cages in the stack, again six or seven stacks high. According to the inventive cage design herein, the large cages and small cages may be stacked in the desired pattern which includes both large cages and small cages within the vertical stack.

In many instances, a large number of animals may be sent from a single location on a single day. For example, if the location is a hamster breeding facility which breeds many thousands of hamsters a month, in some instances, more than two or 300 hamsters may be sent out of the breeding facility on a single day. The same may be true for guinea pigs, mice, rats, and even some types of reptiles, such as lizards. In addition, some facilities may be transit shipping stations in which many different types of small animals passed through the central clearing station. For example, a central clearing station or temporary warehouse may have cages therein which contain many different types of animals it may be a variety of small puppy dogs, kittens, hamsters, guinea pigs, rabbits, baby chicks, ducks, and even various reptiles, such as lizards, snakes, geckos, and the like. Accordingly, some of the cages in the stack may include puppies while other cages in the stack include birds, while yet other cages in the stack include guinea pigs or hamsters.

Figure 37:
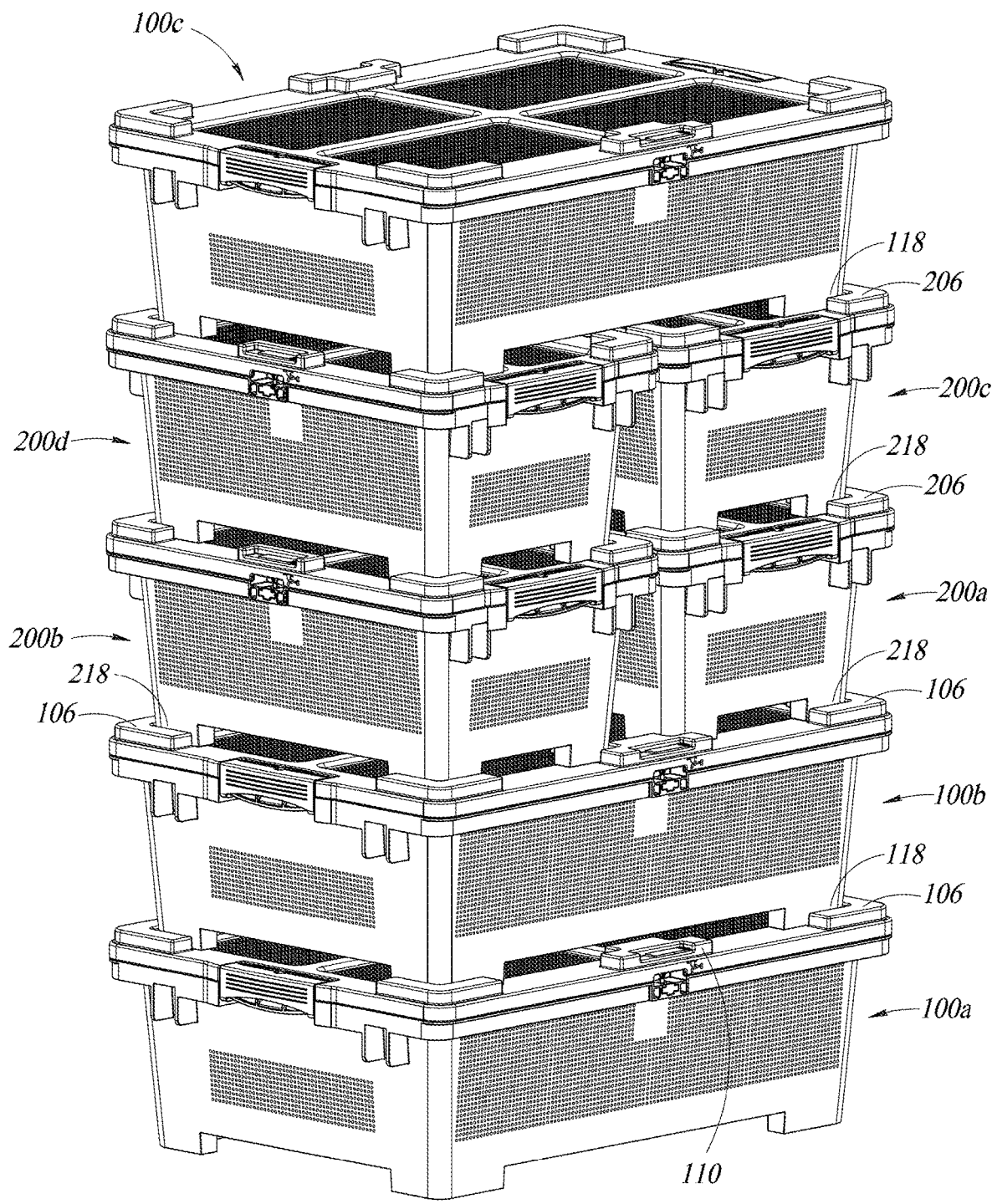
FIG. 37 is an isometric view of the large and small animal cages stacked together on top of each other in a stable formation.
Figure 38:
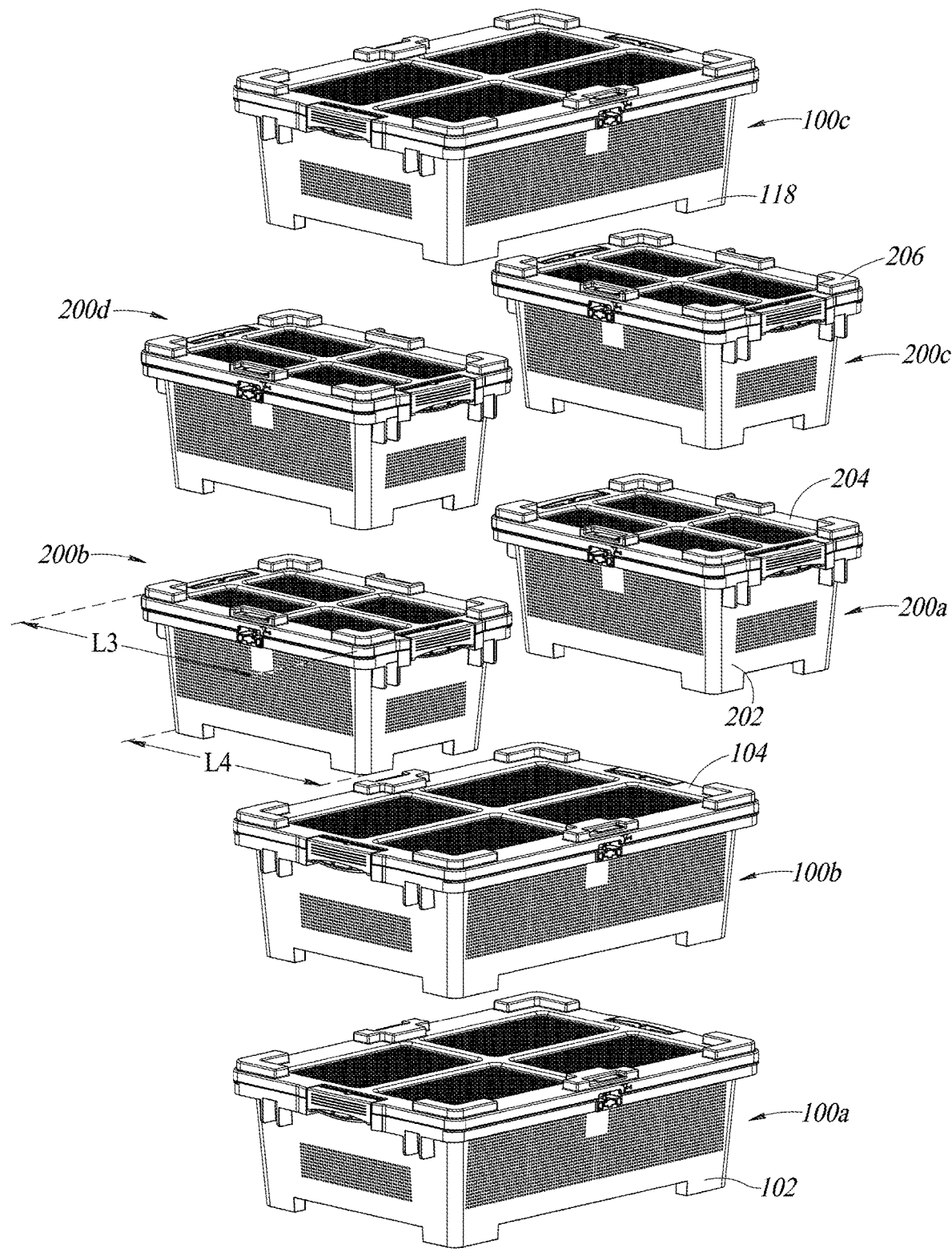
FIG. 38 is an exploded view of the stacked cages of FIG. 37.

As can be seen viewing FIGS. 37 and 38 together, the large cages 100 can be stacked on top of each other with the four legs 118 of the large cage fitting in a snug abutting contact with the ridges 106, being held in position by the inner side walls 108 of the ridges in the four corners of the lid of the large cage directly underneath. This can be seen by the two bottommost large cages in FIG. 37 with a large cage stack on top of another large cage. Namely, cage 100a has cage 100b stacked on the top thereof. In the stacking arrangement, only the four outer corner ridges 106 of the lowermost cage 100a receive the legs 118 of cage 100b. The central ridge 110 is not used. On top of cage 100b to cages 200a and 200b can be stacked. As can be seen viewing FIGS. 37 and 38, particularly the exploded view of FIG. 38 the length L4 of the small cage 200a is equal to the width of the distance of the ridges 106 from each other in the lid 104 of cage 100b further, the length L3 is equal to the entire width of the cage 100b on which it rests. The legs 218 of cage 100a and 200b each respectively fit into the ridges 106 of the cage 100b at the outermost edges. Further, the central ridge 110 receives the inner legs 118 of the respective smaller cages 200a and 200b, which rest against the inner side walls 112 of the ridge 110. The width W3 is equal to the distance between the outer ridge 106 and the central ridge 110 of the lid 104 of the large cage 100, as can be seen in FIGS. 37 and 38. Accordingly, two smaller cages 200a and 200b can be stacked in a perpendicular fashion on top of the large cage 100b. Namely, the small cage 200 has its lengthwise extending across the width of the large cage 100 in which it sits and, therefore, is perpendicular in its extension direction. As can be seen in FIGS. 37 and 38, the cages are sized to permit two small cages to fit snugly on top of the lid of a single cage 100b. Further, two more cages 200c and 200d fit directly on top of the two smaller cages 200a and 200b. This illustrates that the small cages may be stacked on top of each other even without any large cages 100 in the stack. As further illustrated, a large cage 100c can fit exactly into the top lids of two cages 200c and 200d. In this instance, in which a large cage is on top of the smaller cages, the four legs 118 contact the respective ridges 206 of two different cages 200, in the example of FIGS. 37 and 38 cages 200c and 200d. The length L2 of the cage 100 across the bottom is equal to the distance between the inner wall 208 of the ridges 206 of two of the cages 200 that are side-by-side. Thus, the cage 100 position lengthwise extends perpendicular to the cages 200 and spans exactly the length of two cages 200.

This particular arrangement also has the benefit of strengthening the stack based on the interlocking of multiple cages extending perpendicular to each other. In particular, the smaller cages extend perpendicular to the larger cages and therefore provide longitudinal stability in the width direction of the larger cages. In a similar fashion, the larger cages 100 extend along the width of the smaller cages 200 and provide longitudinal stability across the width of the two cages. The larger cages 100 tie the two cages together that are spaced widthwise apart with the lengthwise connection.

FIG. 38 shows an exploded view which illustrates how the legs 118 of the large cage 100b fits into the ridges 106 of the lid of 100a and abuts against the inner side walls 108. Further, it illustrates how the cage 100c has legs 118 that fit into the ridges 206 at the corners of two of the smaller cages 200c and 200d. Further, FIG. 38 shows how two cages 200 and 200b fit into the respective four corner ridges 106 with their outermost legs abutting against the inner side walls 108 of the ridges 106 and their inner legs 218 abutting against the inner side walls 112 of the central ridge 110.

Figure 39:
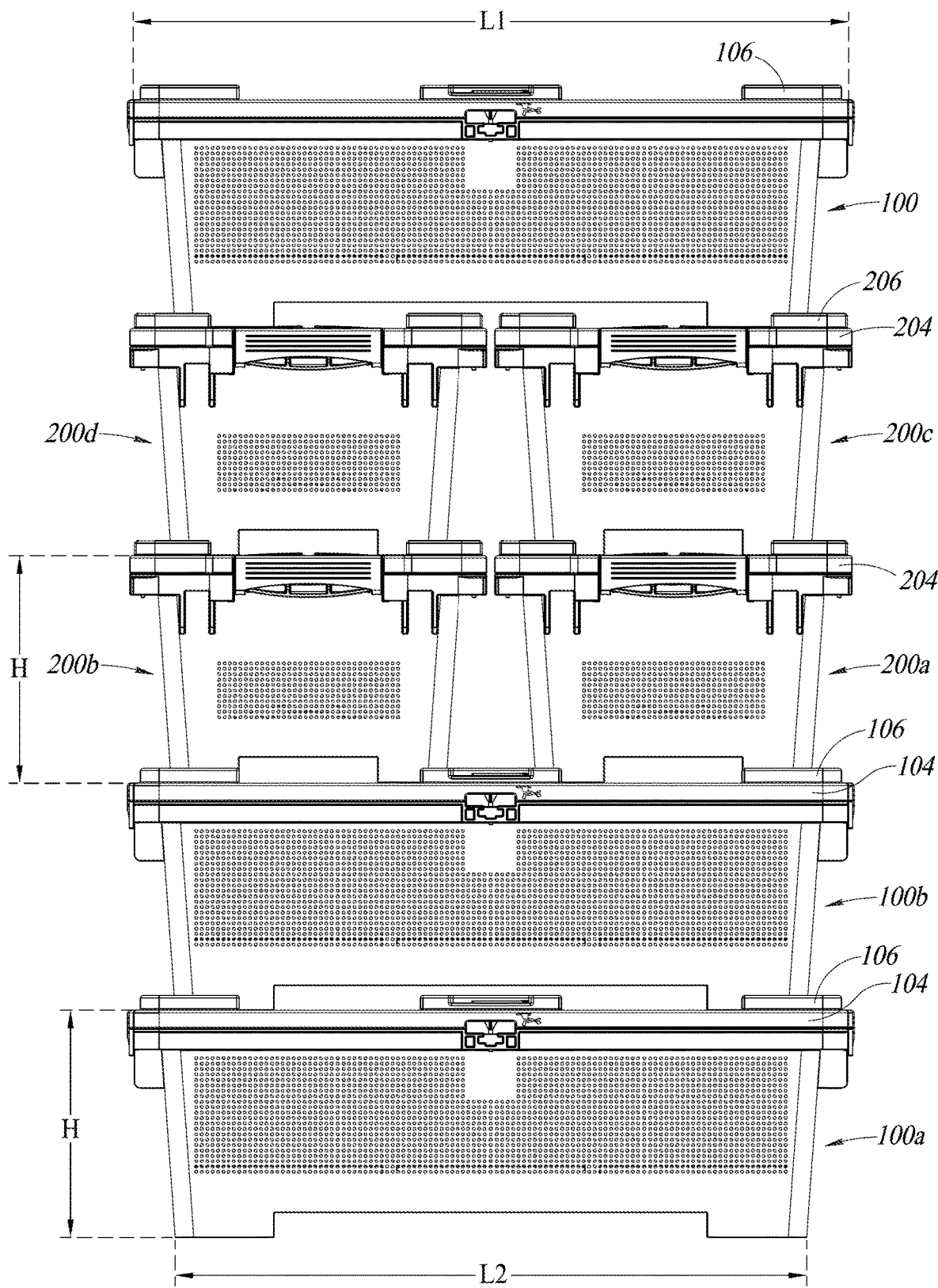
FIG. 39 is a side view of the stack of cages of FIG. 37.
Figure 40:
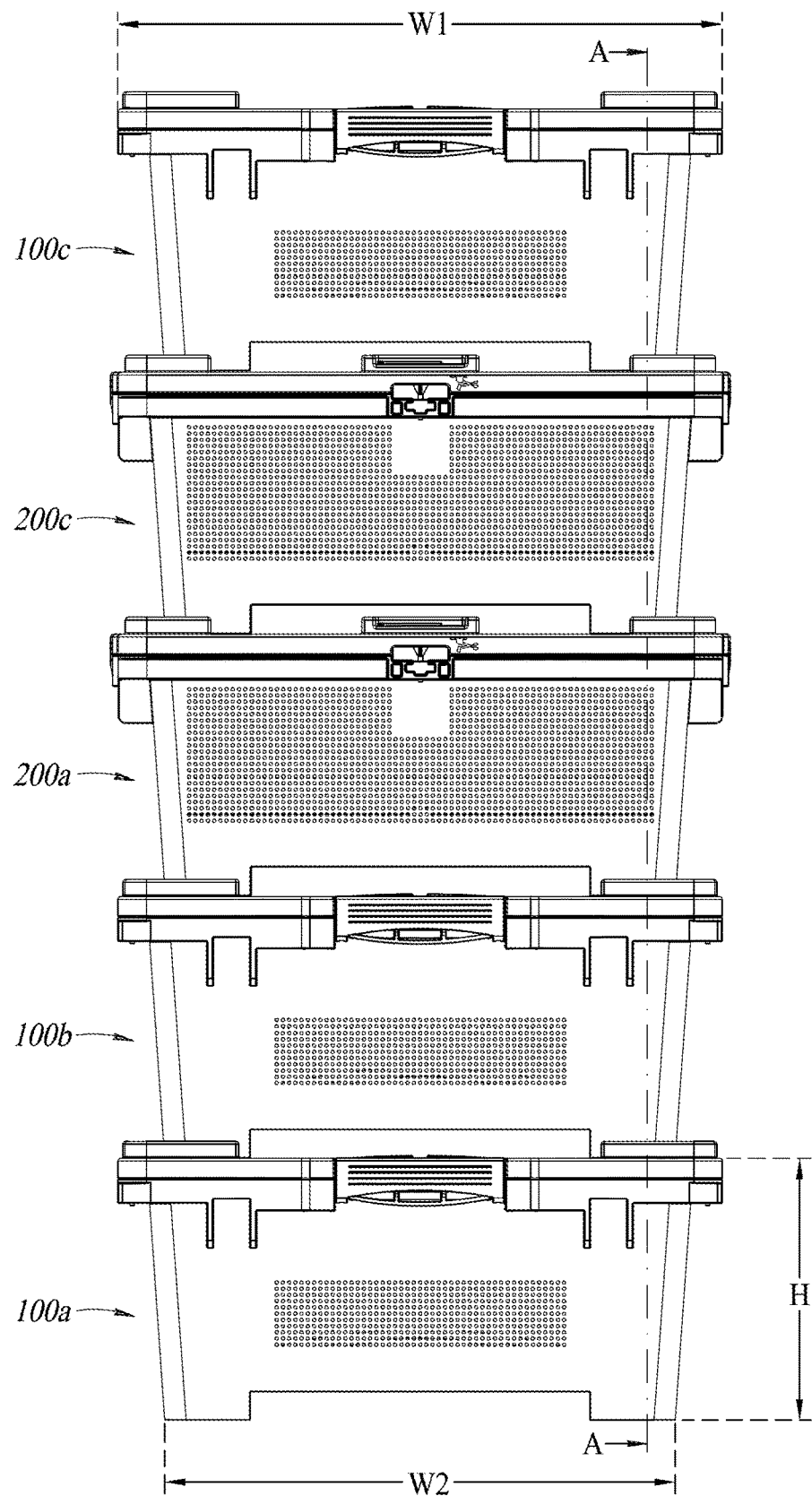
FIG. 40 is an end view of the stack of cages of FIG. 37.

FIG. 39 is a side elevation view of the stack as shown in FIGS. 37 and 38. This shows that each of the cages 100 have the same height as each of the cages 200. Accordingly, the cages have a uniform height even though the width and the length of each cage is different from the other. Further, the side elevation view of FIG. 38 illustrates how the cages 100 extend longitudinally, perpendicular to the width extension of the cages 200 in the stack. FIG. 40 is an end view of the stack, illustrating that the stack has a width W1 to the top and width W2 at the bottom which is equal to the respective widths of the cages 100. The two central cages of the stack 200 have a length which is equal to the width W1 at the top thereof, and a length L4 which is equal to the width W2 at the bottom thereof. This permits the respective lengths L3 and L4 of the cages 200 to be matched to and be aligned with the widths W1 and W2, respectively, of the cages 100.

Figure 41:
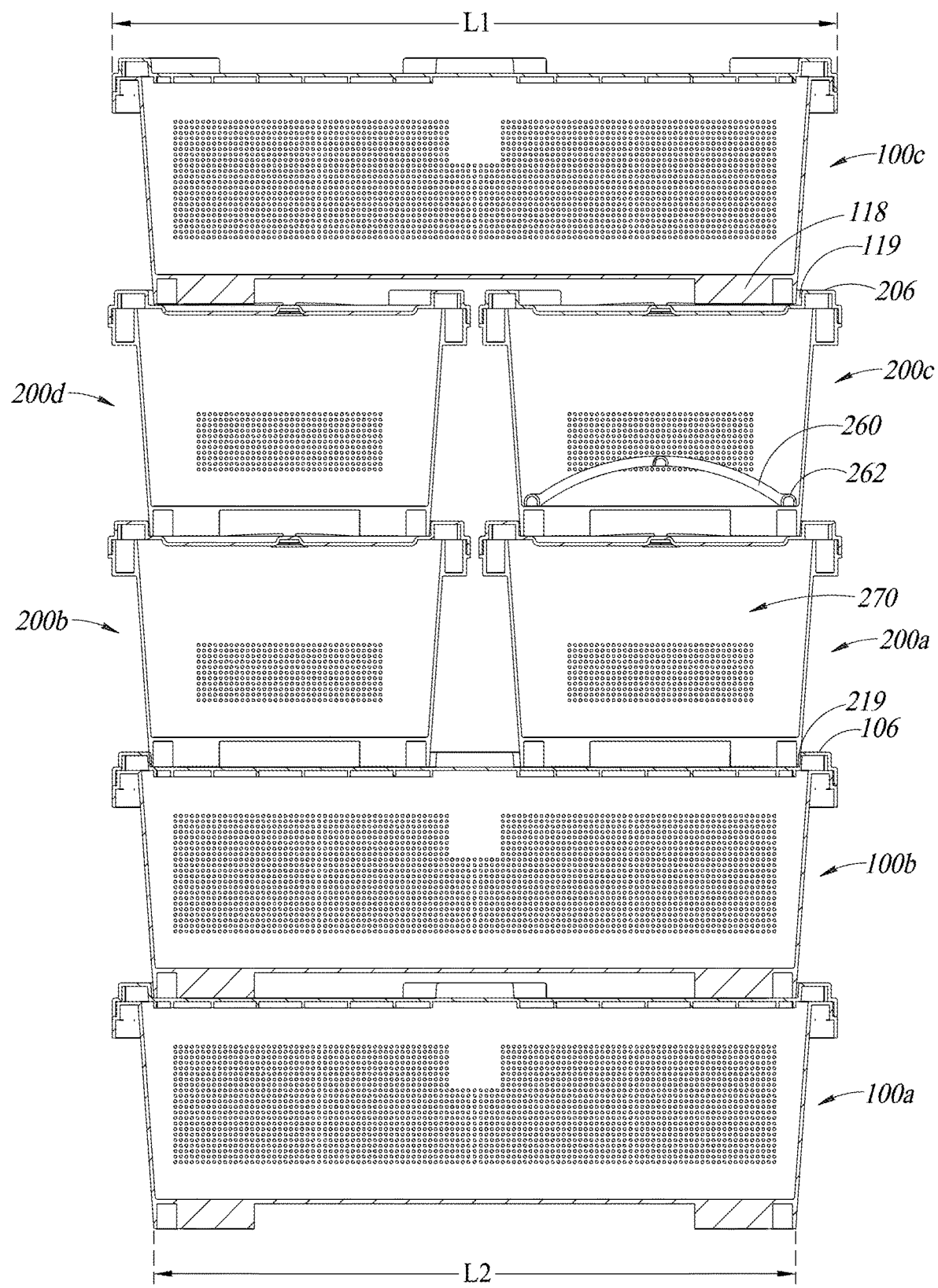
FIG. 41 is a cross-sectional view taken along lines A-A of FIG. 40 showing the stack of cages.

FIG. 41 is a cross-sectional view taken along lines AA of FIG. 4 showing the inside of the cages 200 as they are stacked on top of the cages 100. In particular, shown in FIG. 41, the inside 170 of the cages 100 can be seen and, in addition, the inside 270 of the cages 200 can be seen. In the particular embodiment shown, a perch 260 is illustrated as present in the cages 200c and 200d, but no perch is shown in cages 200a and 200b. Further, no perch is shown in any of the cages 100 for ease of viewing.

Figure 43:
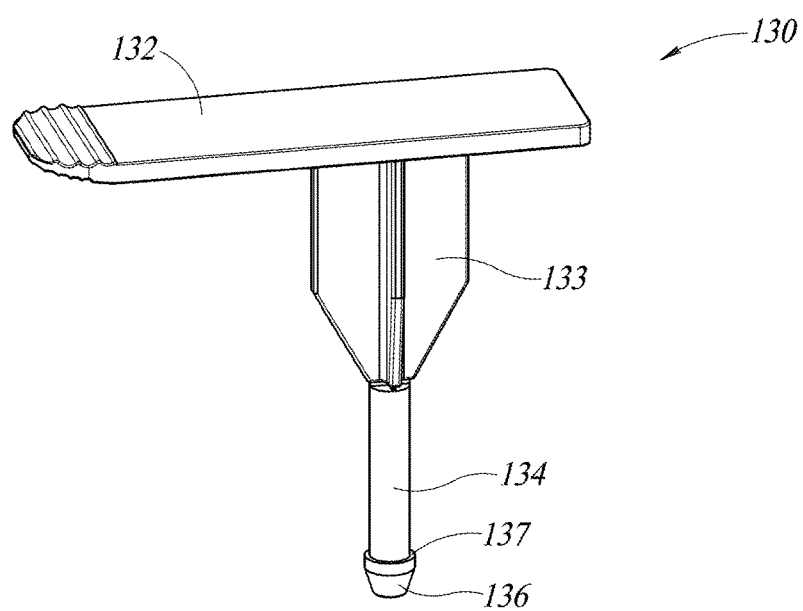
FIG. 43 is an enlarged view of the locking tab.

FIGS. 42 and 43 illustrate the locking tab 130. FIG. 42 is an enlarged view taken from FIG. 6. Looking first at FIG. 42, the position and operation of the tab 130 when it is in the locking position can be seen. In particular, a recess in the center ridge 110 permits the tab 130 to be positioned therein. A top member 132 has ridges 133 which extend therefrom. The ribs 133, which are intricately coupled to the top member 132 are connected to a round shaft 134 having a tip 136 at the end thereof. In a preferred embodiment, the tab 130 is a single, integral contiguous piece that is made by injection molding. Namely, the top member 132, the ridge the ribs 130 extending therefrom, and the central shaft 134 extending therefrom with the tip 136 are all a single contiguous piece produced from a single mold. Injection molding, or other type of molding can be used.

As can be seen in FIG. 42, the locking tab 130 extends through the lid 104 to lock the lid on to the body 102 of the cage 100. In order to lock the lid 104 securely to the cage body 102, the lid 104 is positioned in the on position and the end clamps 114 are closed securely holding the lid 104 in position. In this position, the lid is securely held in the correct position on top of the cage body 102. However, with only the clamps 114 in position, they can be rotated to be pivoted out of positions of the lid 104 can be easily removed. If it is desired to securely lock the cage as the shipment occurs, the additional locking mechanism of the locking tab 130 can be used. In this instance, the locking tab 130 is pressed through an aperture 137 in the lid 104, as seen in FIG. 18. The ribs 133 extend through aperture 137 and down towards the cage body 102. The shaft 134 thereafter enters the aperture 129 and the aperture 131 of the cage 102, and is pressed until the tip 136 extends out of the bottom of the aperture 131. The tip 136 is slightly larger in diameter than the aperture 131 and is somewhat resilient, being made of resilient material such as a hardened plastic, a somewhat flexible fiberglass, and injection molded polymer or other acceptable material. The tip 136 compresses slightly while at the same time the aperture 131 extends slightly in diameter, expanding to receive the probe 130 is the tip 136 as it enters. Once the tip 136 is fully pressed through the aperture 131, it expands outward again and locks the locking tab 130 into position. In the locked position, as shown in FIG. 42, the locking tab 130 securely holds the lid 104 in a locked position on top of the cage body 102. The locking tab 130 has high tensile strength, so that it cannot easily be pulled apart. This effectively provides a permanent, secure and tamperproof lock to positively lock the lid 104 onto the cage 102. If it is desired to ship animals in a secure manner to ensure that the lid 104 will not be removed during handling, then the embodiment in which the locking tab 130 is present will be used for the shipment. For example, if the cages will be shipped by a container connected to a truck, it is possible that during loading or unloading the lid 104 may slip off if only the closing clamps 114 are present. However, with the locking tab 130 present, this provides an additional closure mechanism to both hold the lid 104 in place and also securely lock it in place so that it cannot be removed.

Notably, there is no twisting, turning, bending, or flexure of the tab 103 which will permit the lid 104 to be removed. The locking tab 130 extends in a single contiguous piece through an aperture in the lid 104 and then eight through an aperture in the body 102, it cannot be pulled out because it is locked in position with the large diameter tip 136 pressed against the small diameter aperture 131. It therefore cannot be pulled out in the reverse direction from which it was inserted. Because of the large diameter phalange at the tip 136, if the top member 132 is pulled upward and attempt to pull out the locking tab 130, it will in fact expand slightly and further increase the locking power. Therefore, once it is pushed in, it cannot be removed by pulling, pushing, twisting, or in any other mechanism. As can be seen in FIG. 43, the tip 136 is a somewhat smaller diameter at the front thereof and gradually tapers outward, to have a slightly larger diameter towards the shaft 134. It then reaches a constant diameter for a short distance and has an upper phalange 137 thereon. The phalange 137 is larger in diameter than the aperture 131 and therefore spreads out to securely lock the locking tab 130 in place.

The locking tab 130 provides a tamperproof and secure lock for holding the lid 104 onto the cage body 102. The only way that the locking tab can be removed is by cutting or otherwise severing the shaft 134. An open space 128 is provided by a recess in the lid 104 and a corresponding recess in the cage body 102. This provides an open space in which the locking tab 130 extends which can be easily seen by the shipping person, the user, a receiving dock or other persons handling the cage. If it is desired to open the cage after the locking tab 130 has been placed through the respective aperture is to lock the lid 104 in position the only way it can be removed is by destruction of the locking tab 130. This is accomplished by a receiver or other end-user of the cage 102 that wishes to open the cage putting a cutting device, such as scissors, a knife, a box cutter or other cutting mechanism into the opening 28 and against the shaft 134. When the cutting device extends into the opening 128, then the user may cut the shaft 134 severing the rib 130 and the top member 132 from the shaft 134. When this occurs, the shaft 134 will drop through the bottom of the aperture 131 and the top member 132 can be removed with the rib 133. This has destroyed the locking tab 130 and released its log of the lid 104 onto the cage body 102.

This mechanism is considered a tamperproof lock for a number of reasons. First, it cannot be removed by pulling, twisting, pushing, or other force applied to the locking tab 130. In addition, the phalange 137 of the tip 136 securely holds the locking tab 130 in position and any attempt to pull off the lid 104 will be prevented by the locking tab 130 remaining in position. The cages can therefore be easily shipped long distances, cross country whether by truck or plane, with an assurance that the lid 104 will not come off and the animal stored therein cannot escape. Thus, even if during rough handling, movement of the cargo or other accidents happen the lid 104 we remain in position and the animals store therein will not be able to escape and will not be lost. In the event a person does decide to open the lid 104, they will be required to get a cutting mechanism, such as a knife, pair of scissors, or other strong cutting medical mechanism and, deliberately and intentionally, sever the shaft 134. Since the shaft 134 is in a recessed position, inside the outermost walls of the lid 104 and the body 102, it is not exposed to being handled touched or otherwise contacted during the shipping process. The locking tab 130 can only be accessed by inserting a coping mechanism inside the outermost edges of the extension 122 and into the recess 128. This therefore requires a deliberate action by the user. It also requires that the user have a sharp cutting mechanism that they intentionally press against the shaft 134 with sufficient force to cut it. The cutting of the shaft 134 creates an irreversible separation of the shaft 134. Namely, the severed end of the shaft can't be connected again to the top end 132 of the locking tab 130.

The locking tab 130 is preferable made of a ridged, yet somewhat resilient polymer. For example, it can be made of an injection molded polymer, a plastic, a resin, a rigid rubber, a harden rubber, a glass, nylon or cellulose or other material that once broken, is difficult to restore to its prior condition and that also has some resilience permitting the lager end 136 to be pressed through the aperture 131.

The cage body 102, as well as the cage body 202 and the lids 104 and 204 are also preferably made of a polymer. The polymer making up the respective bodies 102, 202 and lids 104 and 204 can be the same as each other. It is preferred to be of the type that can be injection molded. The material of these structures 102, 202, 104 and 204 is preferably somewhat flexible and resilient. It can be made of a rotational molded material on a rotation mold. It be made by an injection molded polymer. It can be a plastic, a resin, a rigid rubber, nylon or cellulose or other material that is somewhat rigid and also flexible. Materials of this type are well known in the art of cages, containers and boxes.

In a preferred embodiment, the material of the locking tab 130 is harder, more rigid and less resilient than the material of the cage body 102.

Having the entire locking tab recessed ensures that even if the cages bump or come against a sharp sidewall of the trailer doing the shipping that the locking tab 130 will not be cut or otherwise compromised. Even if the cage 100 abuts against the sidewall of the shipping trailer, because the entire locking tab 130 is recessed it will not break, the shaft 134 and the lid 104 would remain securely locked to the body 102. This aspect of the locking tab being fully recessed inside the outermost walls of the lid 104 and the cage body 202 can also be seen by examining FIGS. 1-4. Another beneficial aspect of the locking tab 130 is that if it has been tampered with, this will be readily apparent upon an easy visual inspection. The person receiving the cage can easily notice that the tab 130 is broken, has been severed at the shaft 134. Once it has been shipped, the locking tab 130 cannot be put back together again and the shaft 134 cannot easily be merged again with itself, even with an adhesive. If there is an attempt to reconnect it by gluing or heating to melt them into each other, this will either be impossible to place it back into its prior position or, if it is done, detection of shaft 134 having been once severed will be easy to detect if it connected back to itself. Thus, if a person in the intermediate transportation between the shipper and the receiver has dislodged or cut the locking tab 130 it will be readily apparent when it is received. This will alert the receiver that the lid 104 might have been removed and some of the animals contained therein intentionally removed. Thus, the receiver will know to look into the cage 104 to determine whether or not the manifest is correctly showing the number of animals shipped in that particular container. If the manifest indicates that two puppies, six hamsters, or other certain number of animals were shipped therein but upon receipt fewer than the stated puppies are found therein, or only two hamsters rather than six are found therein, the tampering with the locking tab 130 will be readily apparent and will be easily discoverable that some person in the intermediate shipping chain has cut the shaft 134 and opened the lid in order to remove some of the cargo.

As can be appreciated based on the description a cage for shipment of small animals is provided. The cage body 102 has four sidewalls, four corners and a bottom wall, as can be seen in FIGS. 1, 2 and other figures. There is a leg 118 positioned at each of the four corners of the cage body. These legs 118 extend from the bottom wall of the cage body 102, each leg 118 having two outer surfaces 119 that are generally perpendicular to each other and that extend below the bottom wall of the cage body. A lid 104 is configured to be placed on a cage body 102. The lid 104 has having an upper wall that is the top, horizontal member of the lid. The lid 104 has four corners and a central edge region having a center ridge 110 that is positioned generally in the midway location of the upper wall between each of the four corners. The corner ridge 106 is positioned at each of the four corners of the lid, respectively, each ridge 106 extending above the upper wall of the lid 104, each ridge 106 having two raised regions that extend perpendicular to each other and each raised region having an inner surface 108, the inner surfaces 108 of the ridge 106 being generally perpendicular to each other. There are a plurality of air passage apertures 116 positioned in the sidewalls of the cage body.

The cage body 102 is rectangular in shape. The first and second sidewall of the four sidewalls that are parallel to each other and have a first length and third and fourth sidewall of the four sidewalls that are each perpendicular to the first and second sidewalls and have a second length. In one embodiment the first and second lengths are equal to each other and the cage body is in the form of a square. In another embodiment, the first and second length are not equal to each other, the second length being shorter than the first length, the cage having a length dimension along the first and second sidewalls and a width dimension along the third and fourth sidewalls. In one embodiment, there is a lateral extension portion 122 at an upper region of the cage body 102 that extends outward from its respective sidewall along at least two of the sidewalls of the cage body. In one embodiment, the lateral extension portion 122 extends around the entire circumference of the cage body 102 and is positioned at an upper region of each of the four sidewalls. The cage body includes a plurality of ribs 123 extending from the lateral extension 122 downward, along each of the first and second sidewalls, respectively.

In the cage body 102, the distance from the outer surface of the legs 118 positioned along the length dimension of the first sidewall is equal to the distance between the inner surface of the two ridges 106 positioned on the lid 104 along the same length dimension of the first sidewall. In one embodiment, the distance from the outer surface of the legs 118 positioned along the width dimension of the third sidewall is equal to the distance between the inner surface of the two ridges 106 positioned on the lid 104 along the same width dimension of the third sidewall. Accordingly, the four legs 118 of the cage body can fit into the inside surfaces of the four ridges of the lid if the cage is positioned on top of the lid. This means that cages 100 of the same size can be stacked on top of each other.

For some cages 100, there is a central ridge 110 positioned at a central edge region of the lid 104, the central ridge 110 being positioned midway between the ridges at each end of the lid. The central ridge 110 has an inside surface 112 with two regions that are perpendicular to each other.

In one embodiment, there is a first latch 114 coupled to the cage body along an upper region of one sidewall and a second latch 114 coupled to the cage body along an upper region of a second sidewall.

As described elsewhere herein, there can be two sizes of the cage, a large cage 100 and a smaller cage 200. The large cage 100 has a cage body 102 having four sidewalls, four corners and a bottom wall. The corners can be rounded, as shown in FIGS. 1-10. There is are legs 118 positioned at each of the four corners of the cage body, respectively, and extending from the bottom wall of the cage body 102, each leg having two outer surfaces 119 that are generally perpendicular to each other and that extend below the bottom wall of the cage body 102. A lid 104 is configured to be placed on a cage body, the lid 104 having an upper wall that is the top horizontal structure of the lid itself. The lid 104 has four corners. There is a central edge region that is positioned generally in the midway location of the upper wall between each of the four corners. There is a central ridge 110 positioned in the central region on each side of the lid 104 along the length dimension of the lid 104. There is a ridge 106 positioned at each of the four corners of the lid, respectively, each ridge 106 extending above the upper wall of the lid, each ridge 106 having two raised regions that extend perpendicular to each other and each raised region having an inner surface 108. The inner surfaces 108 being generally perpendicular to each other.

The second, smaller cage 200 also has a cage body 202 having four sidewalls, four corners and a bottom wall. There is a leg 218 positioned at each of the four corners of the cage body, respectively, and extending from the bottom wall of the cage body 202. Each leg 218 has two outer surfaces 210 that are generally perpendicular to each other and that extend below the bottom wall of the cage body 202.

A lid 204 is configured to be placed on the cage body 202, the lid having an upper wall, four corners, and a central edge region that is positioned generally in the midway location of the upper wall between each of the four corners. A ridge 206 is positioned at each of the four corners of the lid, respectively, each ridge 206 extending above the upper wall of the lid 204, each ridge 206 having two raised regions that extend perpendicular to each other and each raised region having an inner surface, the inner surfaces 208 being generally perpendicular to each other. The smaller cage body is rectangular in shape having a first and second sidewall of the four sidewalls that are parallel to each other and having a third length. The third and fourth sidewalls of the four sidewalls that are each perpendicular to the first and second sidewalls and have a fourth length that is shorter than the third length. The smaller cage has a length dimension along the first and second sidewalls and a width dimension along the third and fourth sidewalls.

The distance from the outer surface 219 of the legs 218 positioned along the length dimension of the second cage 200 is equal to the distance between the inner surface 108 of the two ridges 106 positioned at the corners on the lid of the first, larger cage 100 along its width dimension. In addition, the distance from the outer surface 219 of the legs 218 positioned along the length dimension of the second cage 200 is equal to the distance between the inner surface 112 of the two ridges 110 positioned at the center region of the lid of the first, larger cage 100 along its width dimension.

Two of the smaller cages 200 can fit on top of one large cage 100 because the sum of the distance of two width dimensions of the second, smaller cage is less than the distance of the length dimension of the first cage. The first and second cages 100 and 200 respectively are configured to be stacked on top of each other, with the second cage 200 stacked on top of the lid of the first cage 100, having the length of the second cage 200 extending along width of the first cage 100. There can be a plurality of first cages 100 having one first cage 100 stacked on top of the lid of another first cage 100 as shown in FIGS. 37-41. Further a large cage 100 can be stacked on top of two smaller cages 200. In addition, a plurality of smaller, second cages 200 can be stacked on top of a single large cage 100. Two smaller cages 200 can be stacked on top the lid 104 of the large cage 100. Further, a large cage 100 can be stacked on top of the two smaller cages 200 as shown in FIGS. 37-41.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An animal transport system, comprising:
a first cage and a second cage for shipment of small animals, the first cage having:
   a first cage body having a bottom wall, the bottom wall having four corners;
   a leg positioned at each of the four corners of the bottom wall of the first cage body, respectively;
   a first lid configured to be placed on the first cage body, the first lid having an upper surface, the upper surface having four corners, four sides, and an outer peripheral edge;
   a plurality of first corner ridges, each corner ridge of the plurality of first corner ridges positioned at the outer peripheral edge of the upper surface of the first lid and at each respective corner of the four corners of the upper surface of the first lid;
   only two central ridges located at the outer peripheral edge of the upper surface of the first lid on two opposite longer sides of the four sides of the first lid, each of the two central ridges being spaced apart from each other and positioned midway between respective ones of the plurality of first corner ridges, each central ridge having four inner sidewalls, wherein two of the inner sidewalls face toward respective ones of the plurality of first corner ridges and two of the inner sidewalls face toward a respective one of the two central ridges; and
   a plurality of first apertures in the first cage body and the first lid to allow air to enter an interior cavity defined by the first cage body and the first lid in response to the first lid being coupled to the first cage body;
   wherein the first cage body is rectangular in shape and has a first length and a first width less than the first length;
the second cage having:
   a second cage body having a bottom wall, the bottom wall having four corners;
   a leg positioned at each of the four corners of the bottom wall of the second cage body, respectively;
   a second lid configured to be placed on the second cage body, the second lid having an upper surface, the upper surface having four corners, four sides, and an outer peripheral edge;
   a plurality of second corner ridges, each corner ridge of the plurality of second corner ridges positioned at the outer peripheral edge of the upper surface of the second lid and at each respective corner of the four corners of the upper surface of the second lid;
   only two central ridges located at the outer peripheral edge of the upper surface of the second lid on two opposite longer sides of the four sides of the first lid, wherein each of the two central ridges of the second lid include a recess configured to receive a locking tab and have a different shape from the two central ridges of the first lid; and
   a plurality of second apertures in the second cage body and the second lid to allow air to enter an interior cavity defined by the second cage body and the second lid in response to the second lid being coupled to the second cage body, wherein the second cage body is rectangular in shape and has a second length and a second width less than the second length, and wherein the first and second cages are configured to be stacked on top of each other with the legs of the bottom wall of the second cage body received by two corresponding corner ridges of the plurality of first corner ridges of the first lid and the two central ridges of the first lid with the second length of the second cage body aligned with the first width of the first cage body, wherein the second lid of the second cage is configured to receive a further cage stacked on top of the second cage with legs of the further cage received only by at least some of the plurality of corner ridges of the second lid such that the legs of the further cage do not contact the two central ridges of the second lid.

2. The animal transport system of claim 1, wherein the first cage is one of a plurality of first cages and the second cage is one of a plurality of second cages, wherein the plurality of first cages and the plurality of second cages are stackable in an arrangement where one first cage of the plurality of first cages is stacked on top of the first lid of a second first cage of the plurality of first cages, two second cages of the plurality of second cages are stacked on top of the second first cage of the plurality of first cages, and a third first cage of the plurality of first cages is stacked on top of the two second cages of the plurality of second cages, and wherein the two second cages of the plurality of second cages are stacked side-by-side on top of the first lid of the second first cage with each of the legs of the two second cages abutting respective corner ridges and respective inner sidewalls of the two central ridges of the first lid of the second first cage.

3. The animal transport system of claim 1, wherein the upper surface of the first lid of the first cage includes a recess, the plurality of first apertures of the first lid being in the recess in the upper surface of the first lid to allow air to flow into the interior cavity of the first cage when another cage is stacked on the first lid of the first cage.

4. The animal transport system of claim 1, wherein the upper surface of the second lid of the second cage includes a recess, the plurality of second apertures of the second lid being in the recess in the upper surface of the second lid to allow air to flow into the interior cavity of the second cage when another cage is stacked on the second lid of the first cage.

5. An animal transport system, comprising:
a first cage having a first length and a first width less than the first length, the first cage including:
a body;
a lid configured to be removably secured to the body, the lid having a top surface, the top surface having an outer peripheral edge with four sides and four outer corners;
four corner ridges extending from the top surface of the lid, each of the four corner ridges positioned at the outer peripheral edge of the top surface of the lid and at each respective outer corner of the four outer corners of the lid;
two central ridges extending from the top surface of the lid at the outer peripheral edge of the top surface, the two central ridges being on opposite sides of the top surface of the lid from each other and each of the two central ridges having a first cavity and a second cavity, each of the first cavity and the second cavity facing inward toward a center of the top surface of the lid, the first cavity and the second cavity being on opposite sides of each of the two central ridges, where the two central ridges are positioned on only two longer sides of the four sides of the outer peripheral edge of the top surface of the lid; and
two latches on two shorter sides of the four sides of the outer peripheral edge of the top surface of the lid of the first cage; and a second cage having a second length and a second width less than the second length, the second cage including:
a body having a bottom wall;
a plurality of legs extending from the bottom wall of the body; and
a lid configured to be removably secured to the body, wherein the second cage is configured to be received on the first cage in a stacking arrangement with the plurality of legs of the second cage received by a first two of the four corner ridges and the first cavity of each of the two central ridges of the lid of the first cage and the second cage arranged perpendicular to the first cage with the second length of the second cage arranged along the first width of the first cage,
wherein the two central ridges of the lid of the second cage have a rectangular shape open on one side and the two central ridges of the lid of the first cage have a T shape, and
wherein the open side of the two central ridges of the lid of the second cage is a recess configured to receive a tamper-proof locking tab.

6. The animal transport system of claim 5, wherein the top surface of the lid of the first cage includes a recess and a plurality of air passageways in the recess.

7. The animal transport system of claim 5, wherein the lid of the second cage includes a top surface, the top surface of the lid of the second cage including a cavity and a plurality of air passageways in the cavity.

8. The animal transport system of claim 5, wherein the lid of the second cage includes a top surface bounded by an outer peripheral edge, and
wherein the lid of the second cage includes only two central ridges positioned on opposite longer sides of the lid of the second cage at the outer peripheral edge of the top surface of the lid of the second cage.

9. The animal transport system of claim 8, wherein the two central ridges of the lid of the second cage have a different shape than the two central ridges of the lid of the first cage.

10. The animal transport system of claim 8, wherein the top surface of the lid of the second cage includes four outer corners,
wherein the lid of the second cage includes four corner ridges extending from the top surface of the lid of the second cage at each respective outer corner of the four outer corners of the top surface of the lid of the second cage, and
wherein the lid of the second cage is configured to receive a further cage stacked on top of the second cage with legs of the further cage received only by at least some of the four corner ridges of the lid of the second cage such that the legs of the further cage do not contact the two central ridges of the lid of the second cage.

11. The animal transport system of claim 5, wherein the body of the first cage includes four sidewalls and a plurality of air passageways in the four sidewalls.

12. The animal transport system of claim 11, wherein the plurality of air passageways of a first sidewall of the four sidewalls are different in number and arrangement than the plurality of air passageways of a second sidewall of the four sidewalls.

13. An animal transport system, comprising:
a first cage having a first length and a first width less than the first length, the first cage including:
  a body;
  a lid configured to be removably secured to the body, the lid having a top surface, the top surface having an outer peripheral edge and four outer corners;
  four corner ridges extending from the top surface of the lid, each of the four corner ridges positioned at the outer peripheral edge of the top surface of the lid and at each respective outer corner of the four outer corners of the lid; and
  two central ridges extending from the top surface of the lid at the outer peripheral edge of the top surface, the two central ridges being on opposite sides of the top surface of the lid from each other and each of the two central ridges having a T shape with a first extension extending along the outer peripheral edge of the top surface in a length direction of the lid and a second extension extending away from the outer peripheral edge in a width direction of the lid perpendicular to the length direction; and
a second cage having a second length and a second width less than the second length, the second cage including:
  a body having a bottom surface;
  four legs on the bottom surface of the body; and
  a lid configured to be removably secured to the body,
  wherein the second cage is configured to be received on the first cage in a stacking arrangement with the second cage perpendicular to the first cage and the second length of the second cage aligned with the first width of the first cage, and
  wherein two of the four legs of the second cage are configured to be received by two of the four corner ridges of the lid of the first cage and a remaining two of the four legs of the second cage are configured to be received by the two central ridges of the lid of the first cage with each of the remaining two of the four legs of the second cage secured only by one first surface on one first side of the first extension and one first surface on one first side of the second extension of a corresponding one of each of the two central ridges of the lid of the first cage.

14. The animal transport system of claim 13, wherein the lid of the second cage includes two central ridges having a different shape than the two central ridges of the lid of the first cage.

15. The animal transport system of claim 13, wherein the lid of the second cage includes a top surface, the top surface of the lid of at least one of the first cage and the second cage including a plurality of recessed air passageways.

16. The animal transport system of claim 13, wherein the body of the first cage includes four sidewalls and a plurality of air passageways in the four sidewalls, and
wherein the plurality of air passageways of a first sidewall of the four sidewalls of the body of the first cage are different in number and arrangement than the plurality of air passageways of a second sidewall of the four sidewalls of the body of the first cage.

17. The animal transport system of claim 13, wherein the body of the second cage includes four sidewalls and a plurality of air passageways in the four sidewalls,
wherein the four sidewalls include two first sidewalls having the second length of the second cage and two second sidewalls having the second width of the second cage, and
wherein a number of the plurality of air passageways in the two first sidewalls is greater than a number of the plurality of air passageways in the two second sidewalls.

18. The animal transport system of claim 13, wherein each of the four corner ridges of the lid of the first cage have an L shape with inward sidewalls facing towards a center of the top surface of the lid of the first cage,
wherein the four corner ridges and two central ridges of the lid of the first cage are the only ridges on the top surface of the lid of the first cage such that the lid of the first cage is configured to receive only two second cages or only one further first cage,
wherein a further second cage is configured to be received on the top surface of the lid of the first cage in a side-by-side arrangement with the second cage,
wherein in the side-by-side arrangement, two of four legs on a bottom of the further second cage are configured to be received by a remaining two of the four corner ridges of the lid of the first cage and a remaining two of the four legs of the further second cage are configured to be received by the two central ridges of the lid of the first cage with each of the remaining two of the four legs of the further second cage secured only by one second surface on one second side of the first extension and one second surface on one second side of the second extension of the corresponding one of each of the two central ridges of the lid of the first cage,
wherein the one first surface on one first side of the first extension and the one second surface on one second side of the first extension are aligned along a common plane on opposite sides of the first extension, and
wherein the one first surface on one first side of the second extension is opposite to the one second surface on one second side of the second extension with the one first surface on first side of the second extension facing in an opposite direction from the one second surface on the one second side of the second extension.

19. The animal transport system of claim 13, wherein the two central ridges of the lid of the first cage are positioned on two longer sides of the lid of the first cage,
wherein the lid of the first cage further includes two latches positioned on two shorter sides of the lid of the first cage,
wherein the two latches each include a respective first aperture configured to receive a respective locking tab,
wherein the body of the first cage includes two respective second apertures on opposite shorter sides of the body of the first cage each configured to receive the respective locking tab,
each of the locking tabs being a single piece including a top plate integral with a plurality of ribs radially spaced from each other relative to a bottom surface of the top plate, the plurality of ridges tapering into a cylindrical shaft that terminates in a tip having a diameter at an interface between the tip and the shaft that is greater than a diameter of the shaft, wherein each of the locking tabs is configured to be pressed into the respective first aperture of each of the two latches of the lid of the first cage with the plurality of ribs extending through the respective first aperture of the lid of the first cage toward the body of the first cage and the shaft extending through the respective second aperture of the body of the first cage until the tip extends out of a bottom of the respective second aperture of the body of the first cage in a force fit such that the tip of the respective locking tab expands outward after passing through the respective second aperture of the body of the first cage to secure the lid of the first cage to the body of the first cage in a tamper-proof manner.

* * * * *